(12) United States Patent
Mikulich et al.

(10) Patent No.: US 11,783,672 B2
(45) Date of Patent: Oct. 10, 2023

(54) SYSTEM AND METHODS FOR OPERATING A CASINO LOYALTY COMPUTER SYSTEM TO DISPLAY IMAGES OF NON-FUNGIBLE TOKENS ASSOCIATED WITH BLOCKCHAIN TRANSACTIONS ON GAMING DEVICES

(71) Applicant: Station Casinos LLC, Las Vegas, NV (US)

(72) Inventors: Tom Mikulich, Las Vegas, NV (US); Pat Gordon, Las Vegas, NV (US); Jon Von Tobel, Las Vegas, NV (US); William Chad Little, Las Vegas, NV (US)

(73) Assignee: Station Casinos LLC, Las Vegas, NV (US)

(*) Notice: Subject to any disclaimer, the term of this patent is extended or adjusted under 35 U.S.C. 154(b) by 0 days.

(21) Appl. No.: 17/894,840

(22) Filed: Aug. 24, 2022

(65) Prior Publication Data

US 2023/0177921 A1   Jun. 8, 2023

Related U.S. Application Data

(60) Provisional application No. 63/248,972, filed on Sep. 27, 2021.

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |

(52) U.S. Cl.
CPC ...... *G07F 17/3255* (2013.01); *G07F 17/3223* (2013.01); *G07F 17/3239* (2013.01); *G07F 17/3267* (2013.01)

(58) Field of Classification Search
CPC ... G07F 17/32; G07F 17/3211; G07F 17/3214
USPC .............................. 463/1, 20, 22, 25, 30, 39
See application file for complete search history.

(56) References Cited

U.S. PATENT DOCUMENTS

| | | |
|---|---|---|
| 8,429,224 B2 | 4/2013 | Patel et al. |
| 8,926,425 B2 | 1/2015 | Link et al. |
| 9,747,750 B2 | 8/2017 | Link et al. |
| 10,482,712 B2 | 11/2019 | Link et al. |
| 2006/0287051 A1 | 12/2006 | Katz et al. |

(Continued)

*Primary Examiner* — Adetokunbo O Torimiro
(74) *Attorney, Agent, or Firm* — Howard & Howard Attorneys PLLC

(57) ABSTRACT

A networked computer system for displaying images associated with non-fungible tokens (NFTs) on electronic gaming machines (EGMs) is described herein. The networked computer system includes a computer server coupled to a plurality of EGMs located within a casino property. The computer server includes a processor programmed to execute an algorithm to display an animated sequence of computer-generated images on a display device of a corresponding EGM including the steps of querying a blockchain system to identify a casino charm NFT owned by a casino patron, querying a charms content database to retrieve image data associated with the identified casino charm NFT, and rendering an image of the identified casino charm NFT on a game screen displayed on the corresponding EGM.

20 Claims, 30 Drawing Sheets

(56) References Cited

U.S. PATENT DOCUMENTS

2017/0232300 A1* 8/2017 Tran ................. H04L 67/535
　　　　　　　　　　　　　　　　　434/247
2020/0134656 A1　 4/2020 Padmanabhan
2022/0366762 A1　11/2022 Nelson et al.

* cited by examiner

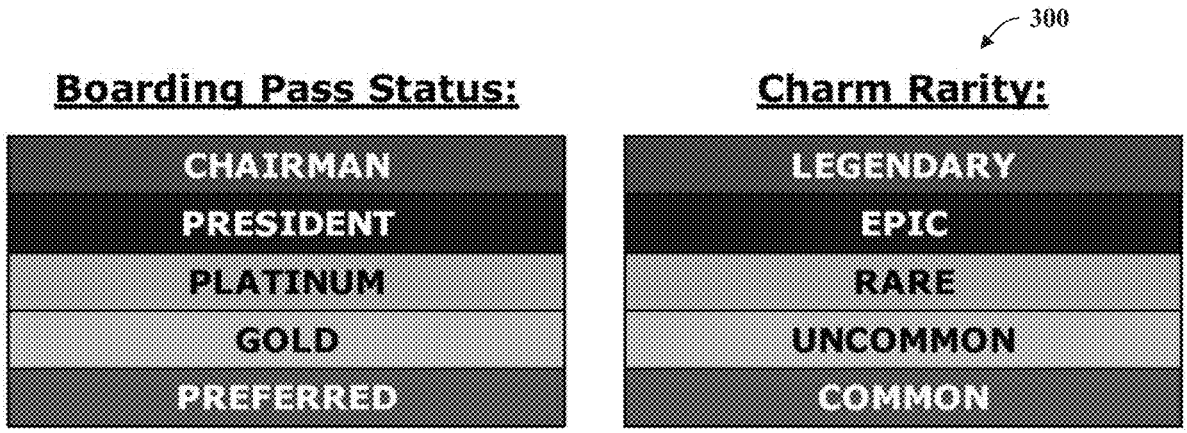

FIG. 9

| | How to Obtain Charms | |
|---|---|---|
| | Method | Description |
| 1) | Earn | Leveling Up |
| 2) | Earn | Quests |
| 3) | Trade | Guests may trade Charms |
| 4) | Event | Guests in attendance of event will receive a unique 1-time only event Charm |
| 5) | Gift Giveaway | Charms given away for gift giveaway |
| 6) | Store Purchase | Guests can buy Charms with Boarding Pass Points via STN Charm Shop |
| 7) | Gift | Guests can give Charms as gifts to friends & family that are bought in STN Charm Shop |
| 8) | Charm Marketplace | Guests can visit the Charm Market to buy and sell Charms amongst themselves. Note that some Charms are not tradeable |

FIG. 10

| Quest Types | | |
|---|---|---|
| | Method | Description |
| 1) | Luck Value | Leveling Up a Charm |
| 2) | Frequency | Visit streaks -- guests can complete these quests by playing a certain number of consecutive days |
| 3) | Variety | Guests can complete these quests by fulfilling certain criteria such as playing at all 6 casino properties or playing in every gaming department in one day |
| 4) | Random | These quests are completed by random events happening, such as hitting a Royal Flush or a taxable jackpot |
| 5) | Loyalty | Quests based on guests playing at casino properties for an extended period of time |

FIG. 11

| CharmNFT ID | Charm Image Object Data | Charm Category | Loyalty Points Purchase Price | Charm Rarity |
|---|---|---|---|---|
| Charm1NFT | 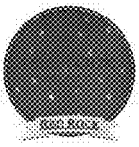 | PROPERTY | 50 | COMMON |
| Charm2NFT | 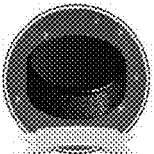 | SPORTS | 100 | UNCOMMON |
| Charm3NFT |  | GAMETYPES | 10 | COMMON |
| Charm4NFT |  | CULTURAL | 500 | EPIC |
| Charm5NFT |  | CHARACTER | 50 | COMMON |
| Charm6NFT |  | QUEST / ACHIEVEMENT | 10000 | LEGENDARY |
| Charm7NFT |  | GAME THEMES | 250 | RARE |
FIG. 13

| Patron ID | Name | Address Information | Wager Information | Loyalty Points | Block Chain Wallet Account ID |
|---|---|---|---|---|---|
| 023148569 | John Smith | 123 Anytown | $32,025 | 32,522 | BKCHN023654 |
| 125865415 | Jane Doe | 524 Anytown | $605 | 2,560 | BKCHN123456 |
| 548695325 | John Doe | 265 Anytown | $65,256 | 20,500 | BKCHN987654 |
| 8965254785 | Adam Smith | 156 Anytown | $23,698 | 252,260 | BKCHN654321 |

FIG. 22

| CharmNFT ID | Charm Image Object Data | | Production Number | Wagering Activity | | Luck Level | Bonus Feature |
|---|---|---|---|---|---|---|---|
| | Charm Card | Charm Icon | | Total Coin-Out | Total Taxable Jackpot | | |
| Charm1NFT | Chrm1-Crd.PGN | Chrm1-Icon.PGN | 103:10,000 | $9,652 | $0 | 17 | 2X Multiplier |
| Charm6NFT | Chrm6-Crd.PGN | Chrm6-Icon.PGN | 1:10 | $3,562 | $10,362 | 18 | Enhanced Paytable |
| Charm42NFT | Chrm42-Crd.PGN | Chrm42-Icon.PGN | 125:300 | $102,652 | $30,368 | 26 | EGM Lighting |
| Charm98NFT | Chrm98-Crd.PGN | Chrm98-Icon.PGN | 1,025:5,000 | $50 | $0 | 6 | Free Spin |

FIG. 23

| Patron ID | Date Stamp | Device ID | Property ID | Wagering Activity | | CharmNFT ID |
|---|---|---|---|---|---|---|
| | | | | Coin-Out | Taxable Jackpot | |
| 023148569 | 02:26:02; 06/21/2023 | EGM0253 | Sunset023 | $3,520 | $0 | Charm23NFT |
| 125865415 | 06:30:12; 06/21/2023 | EGM105 | RedRock025 | $956 | $5,265 | Charm03NFT |
| 548695325 | 12:32:00; 06/21/2023 | ETG065 | Casino025 | $2,056 | $0 | Charm105NFT |
| 8965254785 | 15:23:00; 06/21/2023 | EGM250 | Casino253 | $720 | $10,326 | Charm63NFT |

FIG. 24

| Rarity | Shamrocks | Boarding Pass | Lucky Coins | Pandas | Lucky Footballs |
|---|---|---|---|---|---|
| Common | Hit a jackpot > $1,200 | Sign up for a Boarding Pass | Level up your favorite Charm | Randomly win while playing | Win a football bet |
| Rare | Hit 5 jackpots > $1,200 | Reach Gold status | Level up a Charm to lvl 5 | Randomly win while playing | Hit a 3-team football Parlay |
|  | Hit 25 jackpots > $1,200 | Reach Platinum status | Level up a Charm to lvl 25 | Randomly win while playing | Hit a 6-team football Parlay |
| Epic | Hit 100 jackpots > $1,200 | Reach President status | Level up a Charm to lvl 50 | Randomly win while playing | Hit a 10-team football Parlay |
| Legendary | Hit 1,000 jackpots > $1,200 | Reach Chairman status | Be first to level Charm to lvl 100 | Randomly win while playing | Be the The Last Man Standing |

FIG. 25

| Luck Level | Total Luck | Luck to Next Level | Multiplier |
|---|---|---|---|
| 1 | $0 | $3 | 0.00 |
| 2 | $3 | $5 | 2.97 |
| 3 | $8 | $9 | 3.11 |
| 4 | $17 | $15 | 3.25 |
| 5 | $32 | $25 | 3.40 |
| 6 | $58 | $41 | 3.56 |
| 7 | $98 | $65 | 3.72 |
| 8 | $163 | $102 | 3.90 |
| 9 | $266 | $158 | 4.08 |
| 10 | $424 | $241 | 4.26 |
| 11 | $666 | $362 | 4.46 |
| 12 | $1,027 | $535 | 4.66 |
| 13 | $1,562 | $779 | 4.88 |
| 14 | $2,341 | $1,119 | 5.10 |
| 15 | $3,459 | $1,585 | 5.34 |
| 16 | $5,045 | $2,218 | 5.58 |
| 17 | $7,262 | $3,063 | 5.84 |
| 18 | $10,325 | $4,180 | 6.11 |
| 19 | $14,506 | $5,637 | 6.39 |
| 20 | $20,143 | $7,515 | 6.69 |
| 21 | $27,658 | $9,909 | 6.99 |
| 22 | $37,567 | $12,927 | 7.32 |
| 23 | $50,493 | $16,690 | 7.65 |
| 24 | $67,183 | $21,334 | 8.00 |
| 25 | $88,517 | $27,011 | 8.37 |
| 26 | $115,528 | $33,881 | 8.76 |
| 27 | $149,409 | $42,120 | 9.16 |
| 28 | $191,529 | $51,911 | 9.58 |
| 29 | $243,440 | $63,447 | 10.02 |
| 30 | $306,887 | $76,927 | 10.49 |

FIG. 26

SYSTEM AND METHODS FOR OPERATING A CASINO LOYALTY COMPUTER SYSTEM TO DISPLAY IMAGES OF NON-FUNGIBLE TOKENS ASSOCIATED WITH BLOCKCHAIN TRANSACTIONS ON GAMING DEVICES

CROSS-REFERENCE TO RELATED APPLICATION

This application claims benefit of U.S. Provisional Patent Application Ser. No. 63/248,972 filed Sep. 27, 2021, the disclosure of which is hereby incorporated by reference in its entirety.

FIELD OF THE DISCLOSURE

The present invention relates to networked computer systems for casino property management systems, and more particularly, to systems, methods, and computer-readable storage media to operate casino loyalty program computer system to display animated images associated with non-fungible tokens recorded on blockchain systems on gaming devices and modify the operation of gaming machines, including paytables and/or return to player, based on non-fungible tokens.

BACKGROUND

As the increasingly globalized society accelerates its waves of new technology and innovation, the gaming industry has been impacted by two inversely related trends. Most significantly the technological advances in gaming, while greatly enhancing operational efficiencies, have had a profoundly negative impact on the value proposition of the casino experience for guests. As this casino experience value proposition continues to degrade, the number of competitors striving for a stake of guests' wallets is constantly multiplying, as is their ease of access into those wallets. As a result, the efficacy of casino loyalty programs diminish over time, yet continues to utilize overplayed tactics that are ubiquitous within the gaming industry.

The present invention is aimed at one or more of the problems identified above.

SUMMARY OF THE INVENTION

In one aspect of the present invention, a networked computer system for displaying images associated with non-fungible tokens (NFTs) on electronic gaming machines (EGMs) is provided. The networked computer system includes a computer server coupled to a plurality of EGMs located within a casino property. The computer server includes a processor programmed to execute an algorithm to display an animated sequence of computer-generated images on a display device of a corresponding EGM including the steps of receiving a request to initiate a gaming session at the corresponding EGM including a patron ID and querying a patron account database to determine a blockchain user account ID associated with the received patron ID. The processor then executes the algorithm including the steps of querying a blockchain system to identify a casino charm NFT owned by the blockchain user account ID, querying a charms content database to retrieve image data associated with the identified casino charm NFT, and rendering an image of the identified casino charm NFT on a game screen displayed on the corresponding EGM.

In another aspect of the present invention, a method of operating a networked computer system for displaying images associated with NFTs on EGMs is provided. The networked computer system includes a computer server including a processor coupled to a plurality of EGMs located within a casino property. The method includes the processor performing an algorithm to display an animated sequence of computer-generated images on a display device of a corresponding EGM including the steps of receiving a request to initiate a gaming session at the corresponding EGM, the request including a patron ID and querying a patron account database to determine a blockchain user account ID associated with the received patron ID. The processor then executes the algorithm including the steps of querying a blockchain system to identify a casino charm NFT owned by the blockchain user account ID, querying a charms content database to retrieve image data associated with the identified casino charm NFT, and rendering an image of the identified casino charm NFT on a game screen displayed on the corresponding EGM.

In yet another aspect of the present invention, one or more non-transitory computer-readable storage media, having computer-executable instructions embodied thereon to operate a networked computer system for displaying images associated with NFTs on EGMs is provided. The networked computer system includes a computer server including a processor coupled to a plurality of EGMs located within a casino property. The computer-executable instructions cause the processor to perform an algorithm to display an animated sequence of computer-generated images on a display device of a corresponding EGM including the steps of receiving a request to initiate a gaming session at the corresponding EGM, the request including a patron ID and querying a patron account database to determine a blockchain user account ID associated with the received patron ID. The processor then executes the algorithm including the steps of querying a blockchain system to identify a casino charm NFT owned by the blockchain user account ID, querying a charms content database to retrieve image data associated with the identified casino charm NFT, and rendering an image of the identified casino charm NFT on a game screen displayed on the corresponding EGM.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 8-12 are flowcharts illustrating the algorithms executed by the customer loyalty program computer system for displaying images associated with NFTs on gaming devices located within casino properties, according to embodiments of the present invention;

FIGS. 13-16 are illustrations of exemplary data files generated by the networked computer system, according to embodiments of the present invention;

FIGS. 22-26 are illustrations of exemplary data files generated by the customer loyalty program computer system, according to embodiments of the present invention.

Figure 1:
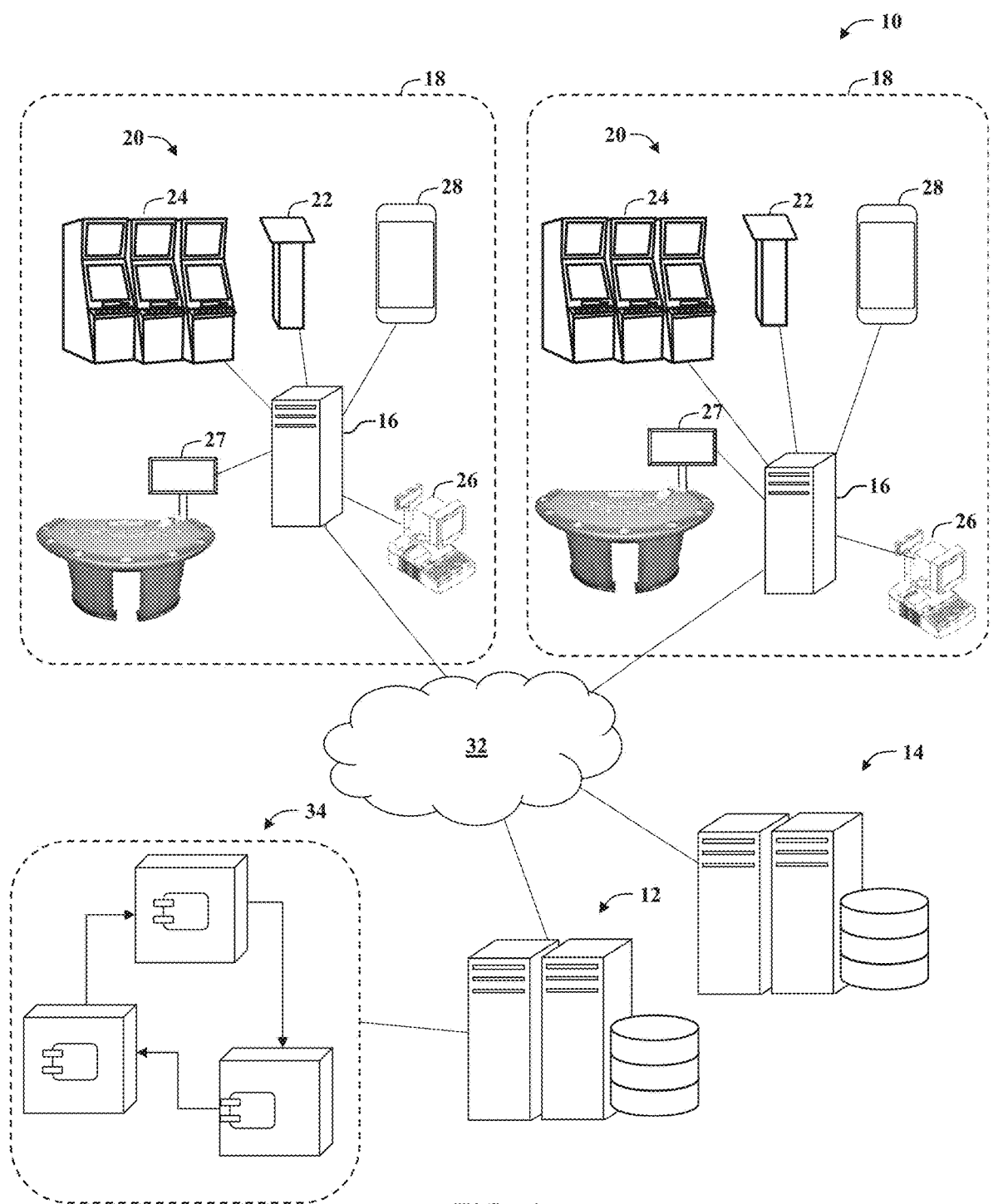
FIG. 1 is a schematic illustrating various aspects of a networked computer system for displaying images associated with non-fungible tokens (NFTs) on gaming devices located within casino properties, according to the present invention.
Figure 2:
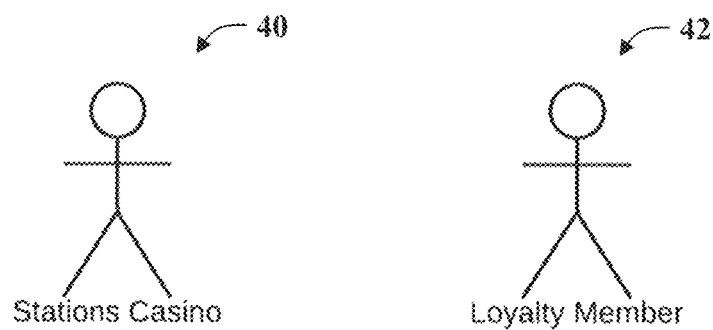
FIGS. 2-7 are schematic diagrams of a customer loyalty program computer system that may be used with the system shown in FIG. 1, according to an embodiment of the present invention.
Figure 3:
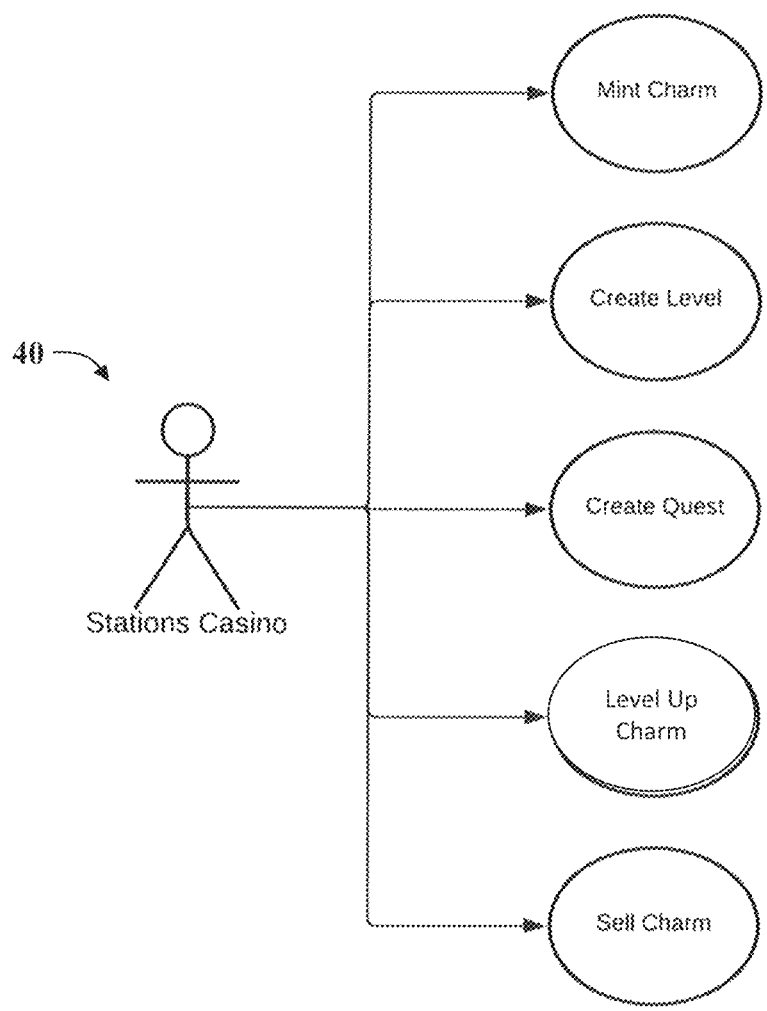
Figure 4:
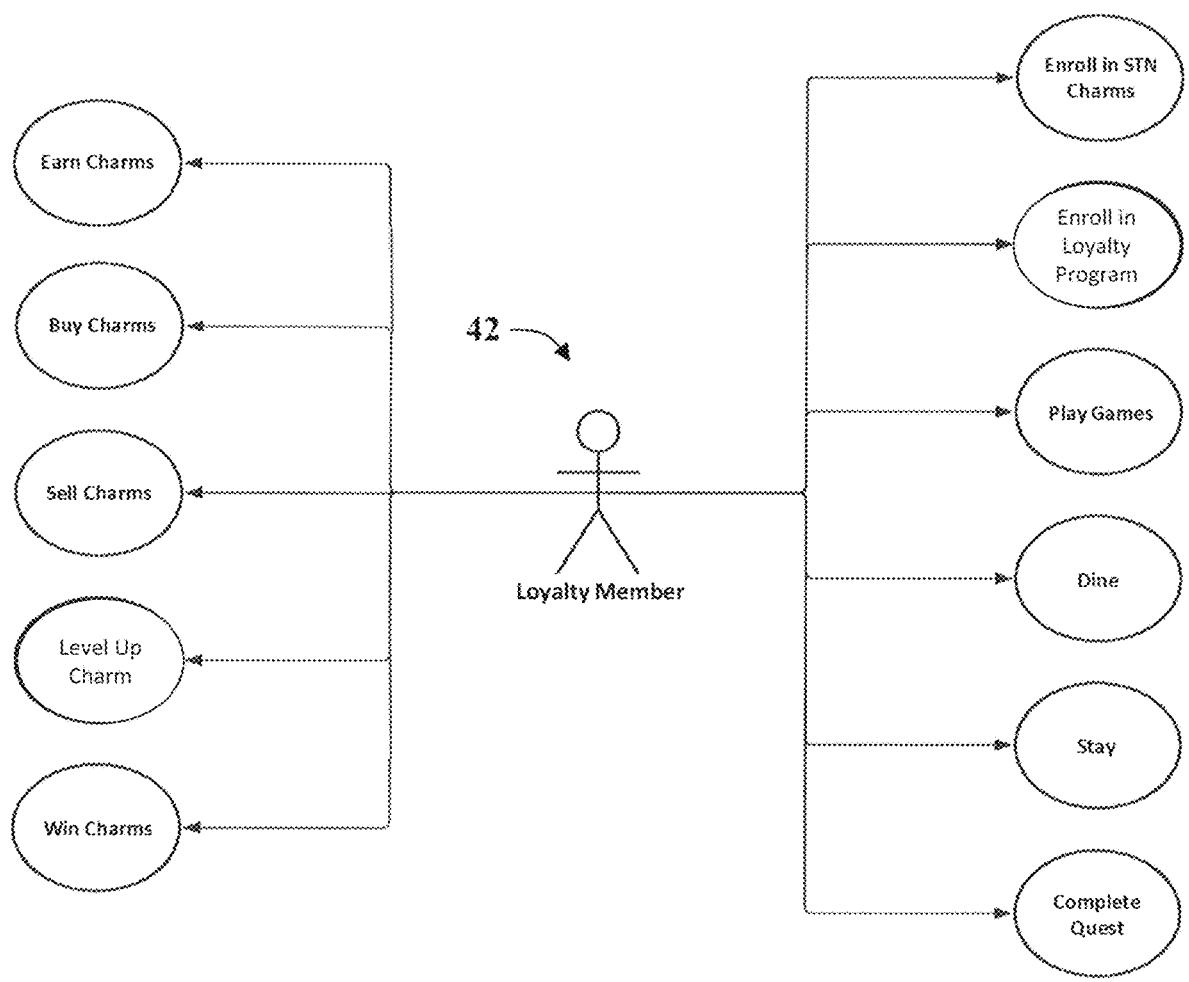
Figure 5:
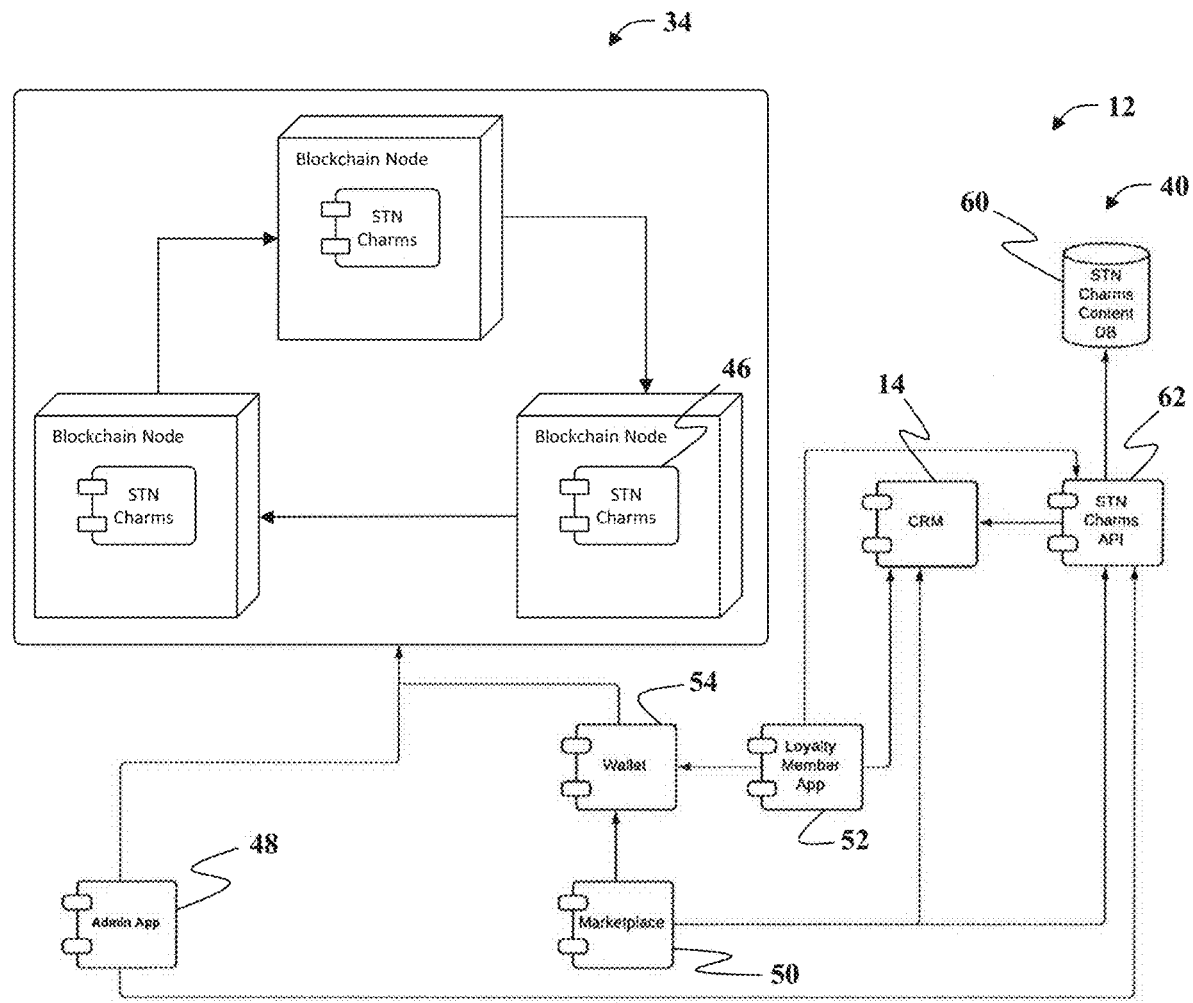
Figure 6:
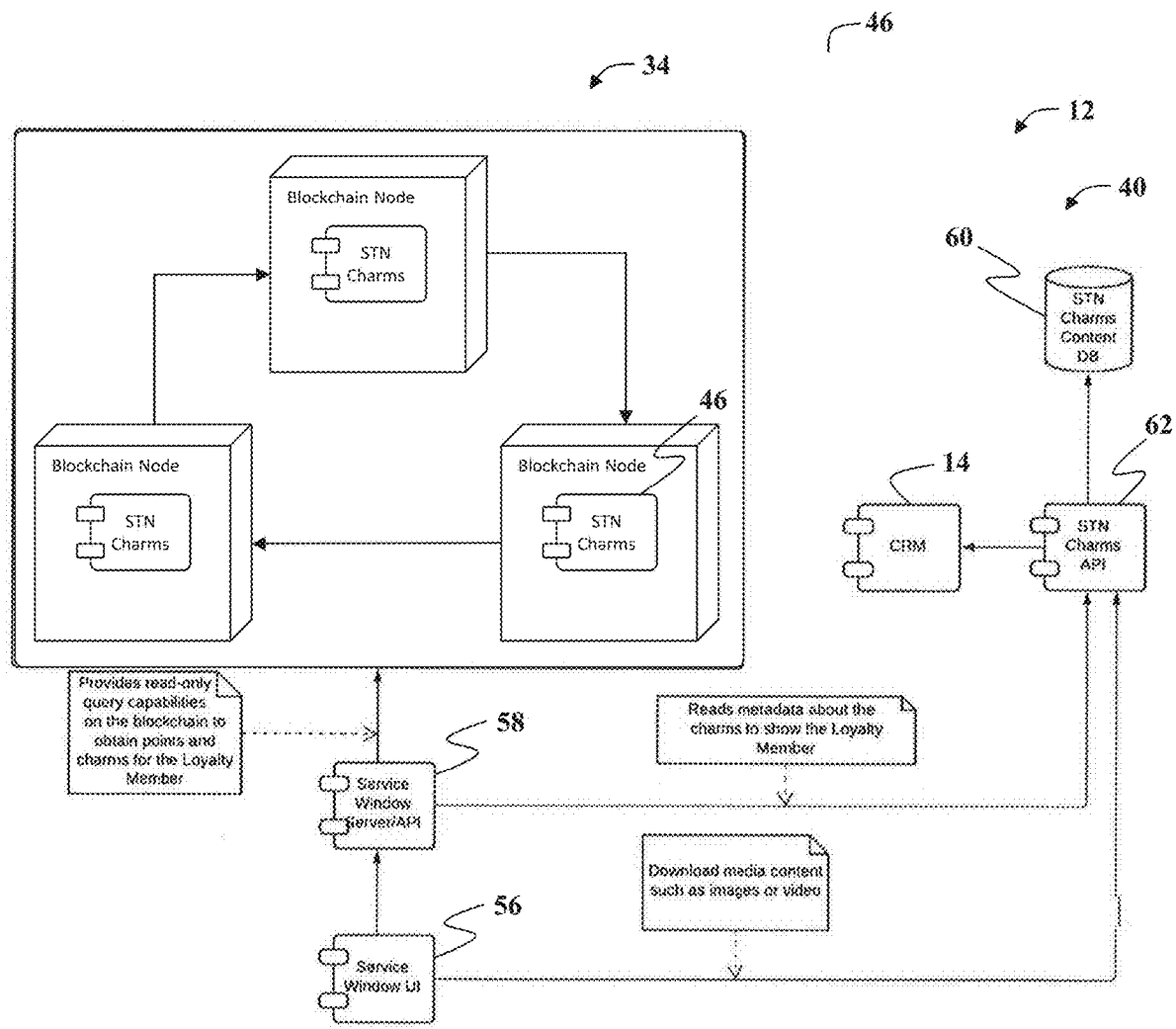
Figure 7:
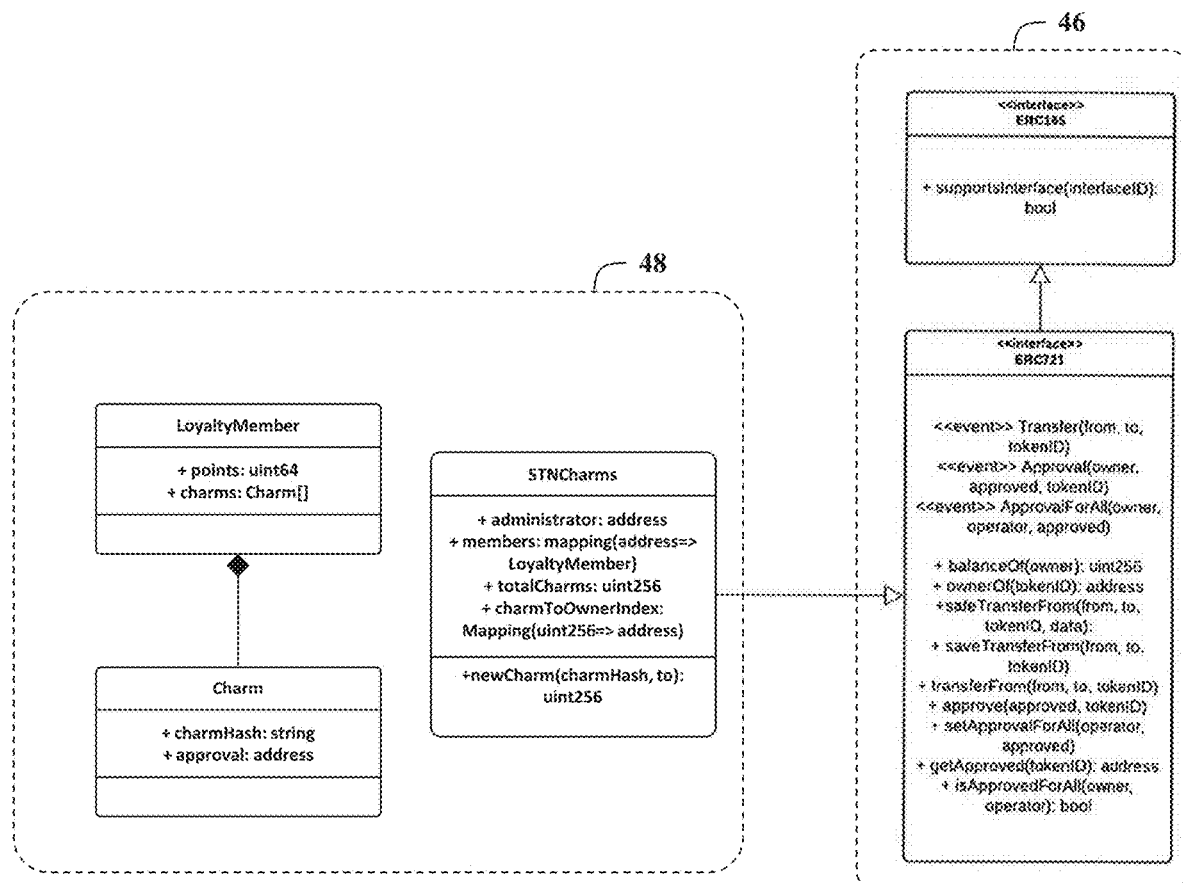
Figure 8:
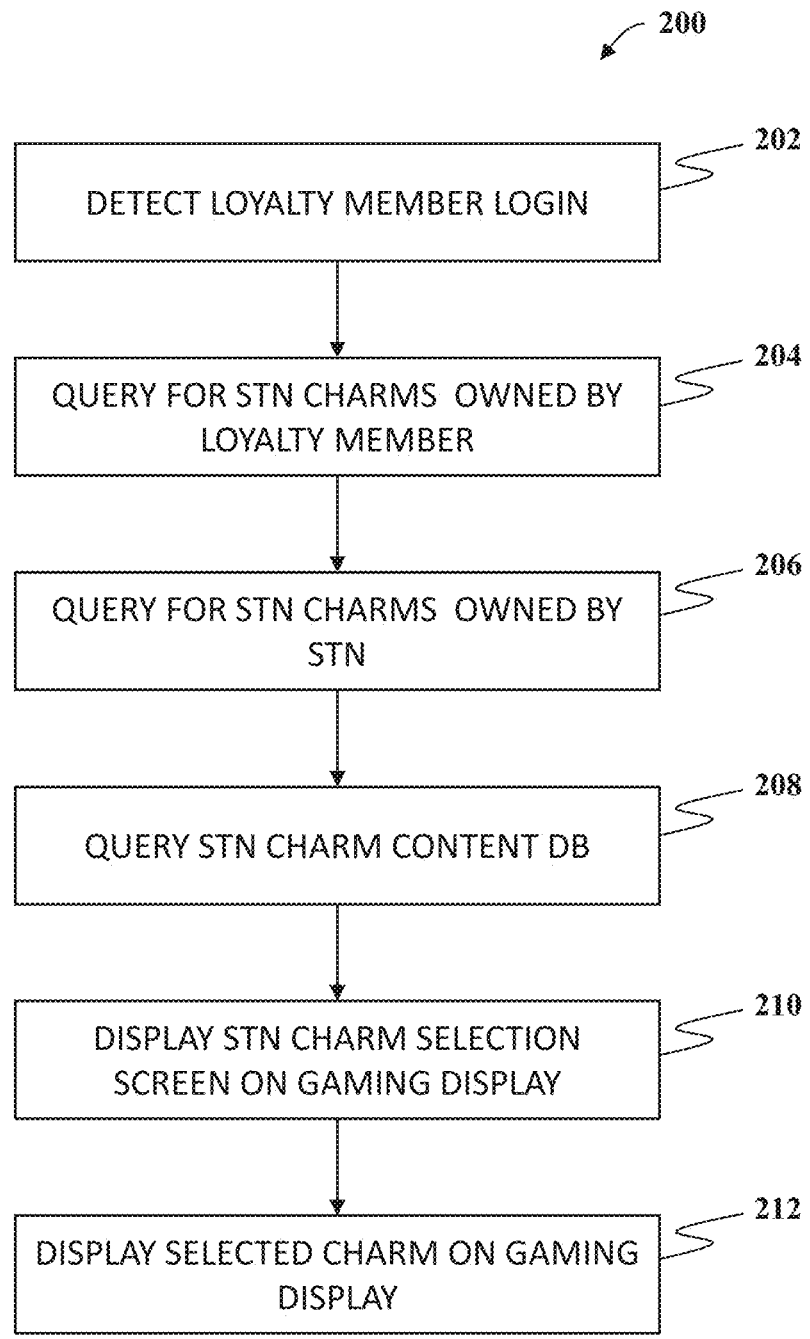

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

With reference to the FIGS. and in operation, the present invention provides a networked computer system, methods and computer product media that monitors the activities of casino patrons within multiple physical casino properties, generates non-fungible tokens (NFT) associated with digital computer-generated images of unique charms to be displayed on gaming devices, modifies the operation of gaming machines, including paytables and/or return to player, based on selected NFT, and facilitates the purchase and sale of the NFTs using a blockchain ledger system.

The system uses Non-Fungible Tokens (NFT) leveraging Blockchain technology to be used in conjunction with Station Casinos' Loyalty Program (Boarding Pass). These NFTs can be accessed by the patron (once they insert their Boarding Pass loyalty card) at a slot machine through the display devices (service window or TFT display) and an individual NFT can be selected to display a preview image, which is a graphical representation of the NFT, on the slot machine's banner located on the slot machine video monitor. This preview image displayed on the banner represents a lucky charm for the player as they play the game.

In an effort to combat these trends and enhance current Customer Relationship Management (CRM) systems, the present invention includes a customer loyalty program computer system programmed to implement an STN Charms™ program offered by Station Casinos™ that draws upon the achievement based foundation of Social Gaming and applies it to Gaming Loyalty Programs to reinvent and add value to the casino experience value proposition, drive incremental trips, cater to both traditional and new guests, while removing access barriers to guests. As symbols of guests' achievements as they progress advance levels and complete quests, they will be rewarded with various themed Non-Fungible Tokens (NFTs), called "Charms", which will utilize blockchain technology. By strategically setting scarcity standards for these Charms, guests will associate various Charms as status symbols and utilize a Charm Market to buy and sell Charms with other guests and/or casino properties.

Blockchain Overview: A blockchain is a database formed by a sequence of entries called blocks. Blockchains have a special characteristic by which any attempt to modify one of its entries would modify the entire chain. It is, therefore, an immutable data structure, which stores blocks in chronological order of insertion. This makes blockchain a perfect storage medium for financial records which need to be audited (such as a Bitcoin transaction). Each entry in a blockchain is called a block, which is a data structure that contains a header and a payload. Every blockchain header must have a field that points to the block before. The link from every block to the block before forms the chain of blocks. These blocks are recorded in chronological order and this order cannot be modified. Therefore, blockchains prove not only that data is valid, but also at which point in time that data was inserted. For this reason, blockchains can be used as "proof of knowledge" of information.

NFT Overview: NFTs (Non-Fungible Tokens) are blockchain-based tokens that each represent a unique asset like a piece of art, digital content, or media. NFTs typically exist on a distributed blockchain ledger system such as, for example, Ethereum™ blockchain, IBM Blockchain™, Tezos™, Stellar™, and the like. Unlike a dollar bill, an NFT cannot be swapped for another similar NFT and inherently have the same value (such as trading a $5 bill for another $5 bill). Utilizing the same 'proof of knowledge' mentioned in the blockchain overview, NFT's are a method of documenting 'proof of ownership'. Ownership has been defined loosely as NFT's have been made for art, videos, GIFs, tweets, and much more, but in reality one can make an NFT for just about anything. It is important to note that once a batch of NFT's is created, that batch cannot be edited or increased in the future. If one were to make 100 NFT's of their coffee cup, once minted there will only be 100 in perpetuity (although this does not prohibit that creator from making another 100 very similar NFT's). Another key feature of NFT's is that there is usually a royalty fee attached to them upon creation (determined by the creator). When an NFT transaction occurs, the buyer of the NFT ends up paying the royalty fee on top of the base price. This royalty fee is incurred every time the NFT is bought/sold and goes to the creator.

Referring to FIG. 1, an exemplary environment in which the networked computer system 10 operates is illustrated. In general, the present invention describes a networked computer system 10 for use in operating a customer loyalty program that generates NFT Charms that may be awarded to patrons. The system 10 interacts with a blockchain ledger system to record NFT Charm transactions associated with NFT Charm creation, NFT Charm ownership, and NFT Charm transactions.

In the illustrated embodiment, the system 10 includes a customer loyalty program computer system 12 that is coupled in communication with a casino management system server 14 and a plurality of player tracking servers 16 located at a plurality of casino property locations 18. The customer loyalty program computer system 12 communicates with the casino management system server 14 and the player tracking servers 16 and executes algorithms to implement the STN Charms™ program. Each player tracking server 16 is coupled in communication with a plurality of gaming devices 20 that are located at a corresponding casino property 18 and are accessible by casino patrons to purchase goods and services provided by the casino property. Each server may include one or more server computers that each include a processing device that includes a processor that is coupled to a memory device. The processing device executes various programs, and thereby controls components of the server according to user instructions received from the gaming devices 20 and/or other servers. The processing device may include memory, e.g., read only memory (ROM) and random access memory (RAM), storing processor-executable instructions and one or more processors that execute the processor-executable instructions.

In the illustrated embodiment, the plurality of gaming devices 20 includes kiosks 22, electronic gaming machines (EGM) 24, a point-of-sale (POS) terminals 26, electronic table games and/or table game display systems 27, and user/patron computing devices 28. The player tracking servers 16 monitor the purchases and activities of patrons and transmits the information to the customer loyalty program computer system 12 and/or the casino management system server 14. The casino management system server 14 generates and maintains patron account records associated with each patron that includes information associated with the purchase and activities of patrons being monitored by the player tracking servers 16, which are then used to award promotional points and/or NFT Charms to patrons that may be used to purchase additional goods and services and/or NFT Charms from the casino properties. For example, the player tracking servers 16 are configured to tracking patrons wagering activity and game play on electronic gaming machines, table games and other gaming revenue areas such as, bingo, keno, and sports wagering. In addition, the player tracking servers 16 are configured to monitor patron purchases of casino property services such as restaurant, spa services, merchandise, hotel rooms, and amenity services through non-gaming revenue POS terminals 26 and/or kiosks 22.

Moreover, the player tracking servers 16 may be configured to monitor patron purchases and activities accessed using user computer software applications such as mobile software applications executed on mobile computing devices and/or websites. In some embodiments, the player tracking servers 16 and/or the casino management system server 14 identifies patrons using patron tracking ID cards and/or a patron identification numbers (PIN) that are linked to the patron account records 30. The casino management system server 14 tracks the patron's gaming play and may award patron tracking points, bonuses, and other incentives according to established criteria to promote continued patron loyalty. For example, in one embodiment, the casino management system server 14 may be configured to implement the myBoardingPass™ player rewards program offered by Station Casinos™.

The gaming devices 20, casino management system server 14, player tracking servers 16, and customer loyalty program computer system 12 communicate via a communications network 32. The communications network 32 may be any suitable connection, including the Internet, file transfer protocol (FTP), an Intranet, LAN, a virtual private network (VPN), cellular networks, etc. . . . , and may utilize any suitable or combination of technologies including, but not limited to, wired and wireless connections, always on connections, connections made periodically, and connections made as needed.

In the illustrated embodiment, each user/patron computing device 28 includes a display device and a processing device that includes a processor that is coupled to a memory device. The processing device executes various programs, and thereby controls components of the computing device according to user instructions received by the user to enable the user to access and communicate with the system 10 including sending and/or receiving information to and from the system 10 and displaying information received from the system 10 to the user.

For example, in some embodiments, the user computing device 28 may include, but is not limited to, a desktop computer, a laptop or notebook computer, a tablet computer, smartphone/tablet computer hybrid, a personal data assistant, a handheld mobile device including a cellular telephone, and the like. In addition, the user computing device 28 may include a touchscreen that operates as the display device and the user input device. In the illustrated embodiment, the user computing device 28 includes a web-browser program that is stored in the memory device. When executed by the processor of the user computing device, the web-browser program enables the user computing device to receive software code from the system 10 including, but not limited to, HTML, JavaScript, and/or any suitable programming code that enables the user computing device to generate and display a website and/or webpages on the display device of the user computing device.

Similarly, kiosks 22 may include a touchscreen display and processor for executing web-browser programs to receive software code from the system 10 and display a website and/or webpages on the touchscreen display. In addition, the kiosks 22 may also include a card reader device for obtaining patron ID's stored on the physical patron tracking ID cards.

In one embodiment, the user computing device 28 may include a mobile computing device such as, for example, a tablet computer, a smartphone/tablet computer hybrid, a smartphone such as an iPhone™, Samsung Galaxy™, and the like. The mobile computing device includes a processor coupled to a memory device for storing various programs and data for use in operating the mobile computing device. The mobile computing device may also include a touchscreen display unit, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device may also include a Wi-Fi antenna, a cellular network antenna, a Bluetooth™ communications device, assisted GPS and GLONASS, a digital compass, and an iBeacon™ microlocation device. The mobile computing device may be programmed to store and execute mobile computer program applications that display graphical user interfaces on the touchscreen display unit that allows the user to access the system 10 to retrieve and store information within the system 10 as well as interact with and operate the system 10. For example, the system 10 may be configured to implement a mobile application such as, for example, the "STN™" mobile application offered by Station Casinos™ available in Apple iOS™, Google Android™, and Amazon Kindle™ operating platforms, or on social-media websites such as Facebook™.

In some embodiments, the POS terminal 26 includes a computer processor, a monitor (e.g., a cashier-facing monitor), one or more input devices (e.g., scanners, keyboards, scales, or the like), one or more payment devices (e.g., cash drawers, card readers) for receiving or returning payments, one or more output devices (e.g., customer-facing display monitor, receipt printer), or the like or combinations or sub-combinations thereof, and a near field communication (NFC) device, such as, for example, an NFC dongle. The input devices and payment devices can feed data and commands to computer processor for processing or implementation. For example, a barcode scanner can pass data communicating the identity of one or more items to be purchased, returned, or the like to a computer processor. Similarly, a card reader can pass payment information and/or patron ID information to the computer processor. Similarly, customer-facing display and receipt printer can display or output data or information as instructed by the computer processor.

The electronic gaming machine (EGM) 24 includes a gaming cabinet that houses a display device and a gaming controller that includes one or more gaming computer processors for generating and displaying a plurality of games on the display device. The display device of the EGM may include a touchscreen display. The gaming computer processor executes a wagering game program that uses a random number generator to randomly generate outcomes of the games, which allows a player to make a wager, play a game, and potentially provide the player an award based on an outcome of the game and a paytable. For example, in some embodiments, the EGM 24 executes a video slot machine that executes a game including a plurality of video reels displaying game symbols. The EGM 24 may also execute any type of game including, but not limited to, a video slot game, a keno game, a blackjack game, a video poker game, or any type of game which allows a player to make a wager and potentially provide the player an award.

In some embodiments, the EGM 24 includes a user input device that includes a plurality of input buttons and an acceptor device that includes a coin slot and/or a bill acceptor. The acceptor device includes an input and output device that is configured to accept a bill, a ticket, and/or a cash card into the acceptor device to enable an amount of gaming credits associated with a monetary value of the bills, ticket, and/or cash card to be credited to the gaming device. For example, the acceptor device may utilize a cashless wagering system (not shown), such as a ticket in ticket out (TITO) system (not shown). The EGM 24 may also include a player tracking device that communicates with the player tracking server 16. The player tracking device includes a player identification card reader and a display. The player identification card reader is configured to accept a player tracking ID card inserted by the player, and read information contained on the player tracking card to identify the player account information. The player identification card reader may include, but is not limited to, a barcode reader, a magnetic card reader, and/or a radio frequency identification (RFID) card reader. The display device may include a touchscreen panel that includes a keypad to allow the player to enter a unique PIN that is used by the player tracking server 16 to identify the patron and the corresponding patron tracking account. The player tracking device is configured to communicate player account information and gaming activity between the player tracking server 16 and the EGM gaming controller. For example, the player tracking device may be used to track bonus points and/or credits awarded to the player during a gaming session and/or track bonus and/or credits downloaded to the EGM 24 from the player tracking server 16.

FIGS. 2-7 are schematic diagrams illustrating example components of the customer loyalty program computer system 12. FIGS. 8-12 illustrate the algorithms 200-600 executed by the customer loyalty program computer system 12. The algorithms include a plurality of steps. Each algorithm step may be performed independently of, or in combination with, other method steps. Portions of the algorithms may be performed by any one of, or any combination of, the components of the system 10. The customer loyalty program computer system 12 includes one or more processors that are programmed to execute the algorithms shown in FIGS. 8-12 and described herein.

In the illustrated embodiment, the customer loyalty program computer system 12 communicates with a distributed blockchain ledger network system 34 to implement the STN Charms™ program. The distributed blockchain ledger network system 34 may include, for example, Ethereum™ blockchain, IBM Blockchain™, Tezos™, Stellar™, and/or any suitable distributed blockchain ledger system that support NFT deployment. The STN Charms program seeks to enhance the customer loyalty program using charms that are awarded to loyalty members for various purposes. Loyalty members will receive benefits based on the charms that they possess and can continue to earn more charms. The charms program is designed so that charms have scarcity that set or increase their value over time. Members will also be able to sell and/or buy casino charm NFTs in an online marketplace, with Station Casinos earning royalties on transactions.

The STN Charms program is implemented using Blockchain technology. Casino charm NFTs 36 (shown in FIGS. 13-16) are modeled as non-fungible tokens (NFTs) that are registered with the blockchain. The customer loyalty program computer system 12 is programmed to mint new charms and award them to members through the blockchain. Transactions involving the charms will also occur using the blockchain. Using blockchain technology to implement STN Charms program brings trust and verifiability to the STN Charms program allowing the customer loyalty program computer system 12 to verify ownership of charms when members receive benefits and providing an audit trail for review.

One mechanism that charms will be awarded to customers is through the accumulation of points. Some channels through which points may be accumulated by members include gaming at a casino, staying at a hotel, or dining in a restaurant. The accumulation of points may be tracked in the blockchain for each member. As the member earns new points, they may cross a level threshold which will automatically award the member a new charm. Point acquisition are recorded in the blockchain.

Members may also earn charms through the completion of quests. A quest is a challenge with an associated goal that is set by the customer loyalty program computer system 12. Members may voluntarily accept a quest and progress through the quest towards achieving the goal. When the goal is achieved, then the desired charms is awarded to them. Quest achievements and rewards are recorded in the blockchain.

The customer loyalty program computer system 12 implements the STN Charms program using a dApp using the blockchain system 34, data stored in the blockchain, and data stored outside of the blockchain.

The STN Charms program includes two primary actors: Casino Operator 40 (e.g., Station Casinos) and Loyalty Members 42 (e.g., casino property guest).

Station Casinos Actor: The Station Casinos actor includes one or more approved administrators that represent the interests of Station Casinos and who are authorized to mint and assign charms to Loyalty Members. The actions that Station Casinos can perform includes: Minting new charms to award to Loyalty Members or to be sold in the Marketplace (shown in FIGS. 35-40); Configuring achievement levels and the charms to be awarded when the Loyalty Member earns enough points; Creating quests that the Loyalty Member can perform and defining the charm that will be awarded to members that complete the quest; and Leveling-up charms and/or increasing a charm luck level; providing a charms shop marketplace to purchase and/or sell NFT charms; and providing additional NFT charms (e.g., charm drops at predefined intervals, e.g., monthly, weekly, daily, etc.) for purchase via the charms marketplace.

Loyalty Member Actor: A Loyalty Member is a customer of Station Casinos that enrolls in the STN Charms program. The Loyalty Member is a frequent customer who wishes to engage with Station Casinos in a richer way and receive benefits from the customer relationship. The Loyalty Member will earn charms by spending time and money in the casino, eating at a restaurant, staying at the hotel, or through other activities. The Loyalty Member is also interested in purchasing new charms to unlock casino benefits or buying and/or selling charms with other members in the Marketplace (shown in FIGS. 35-40).

Architecture Overview: The customer loyalty program computer system 12 is programmed to implement the STN Charms program using blockchain technology provided by the blockchain system 34 such as, for example, Ethereum™ blockchain, IBM Blockchain™, Tezos™, Stellar™, and the like. For example, Ethereum™ is a blockchain network fueled by a cryptocurrency named ETH. The blockchain system 34 is a shared, immutable ledger that facilitates the process of recording transactions and tracking assets in a business network. An asset can be tangible (a house, car, cash, land) or intangible (intellectual property, patents, copyrights, branding). The blockchain system 34 includes distributed ledger technology in which all network participants have access to the distributed ledger and its immutable record of transactions. The blockchain system 34 includes a blockchain ledger 44 (shown in FIG. 12) of immutable records in which no participant can change or tamper with a transaction after it's been recorded to the shared ledger. The blockchain 44 acts as a log or ledger of transactions between parties. The blockchain 44, and Ethereum, are decentralized, meaning that there is no single source of failure. The blockchain is implemented by multiple distributed nodes that each control a complete and accurate copy of the ledger at all times. When transactions are added to the blockchain, all of the nodes in the blockchain agree on where in the ledger the transaction will be recorded using a consensus algorithm.

The STN Charms program is implemented using Smart Contract technology following standards established for non-fungible tokens. STN Charms may implement the ERC-721 standard, the ERC1155 multi token standard, and/or any suitable standard for deployment of non-fungible token types. For example, existing standards such as ERC-20 require deployment of separate contracts per token type; the ERC-721 standard's token ID is a single non-fungible index and the group of these non-fungibles is deployed as a single contract with settings for the entire collection; and the ERC-1155 Multi Token Standard allows for each token ID to represent a new configurable token type, which may have its own metadata, supply and other attributes. In one embodiment, the ERC-721 defines a standard contract for representing and transacting non-fungible tokens. STN Charms may specialize its implementation of ERC-721 for the purpose of issuing, managing, verifying, and performing transactions on charms.

Figure 12:
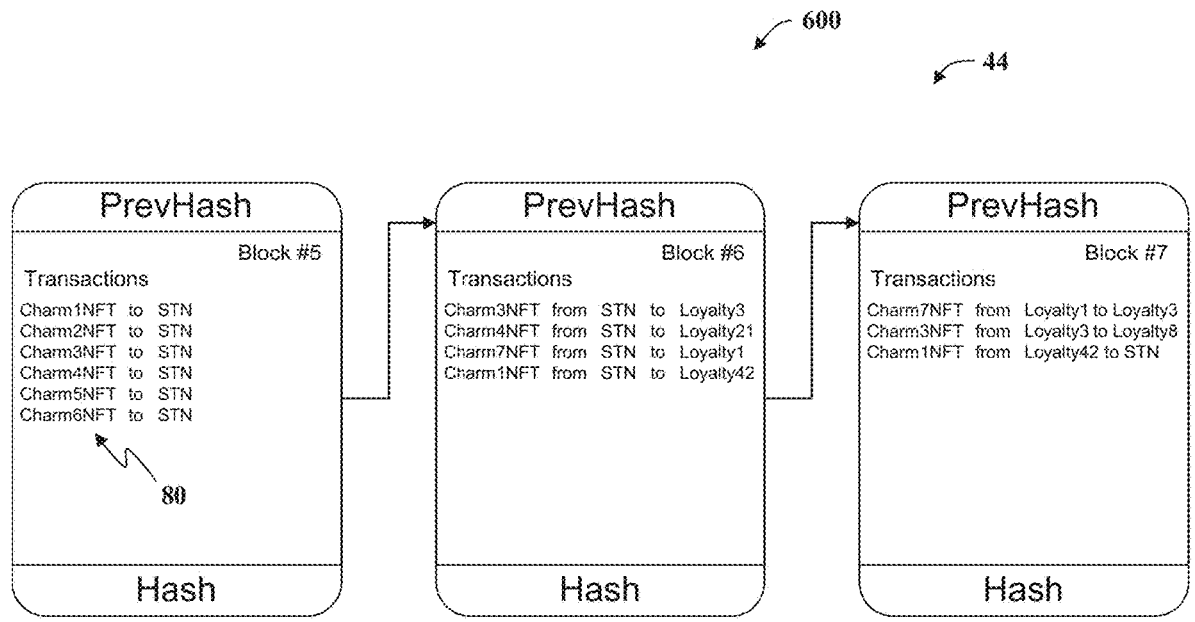
Figure 14:
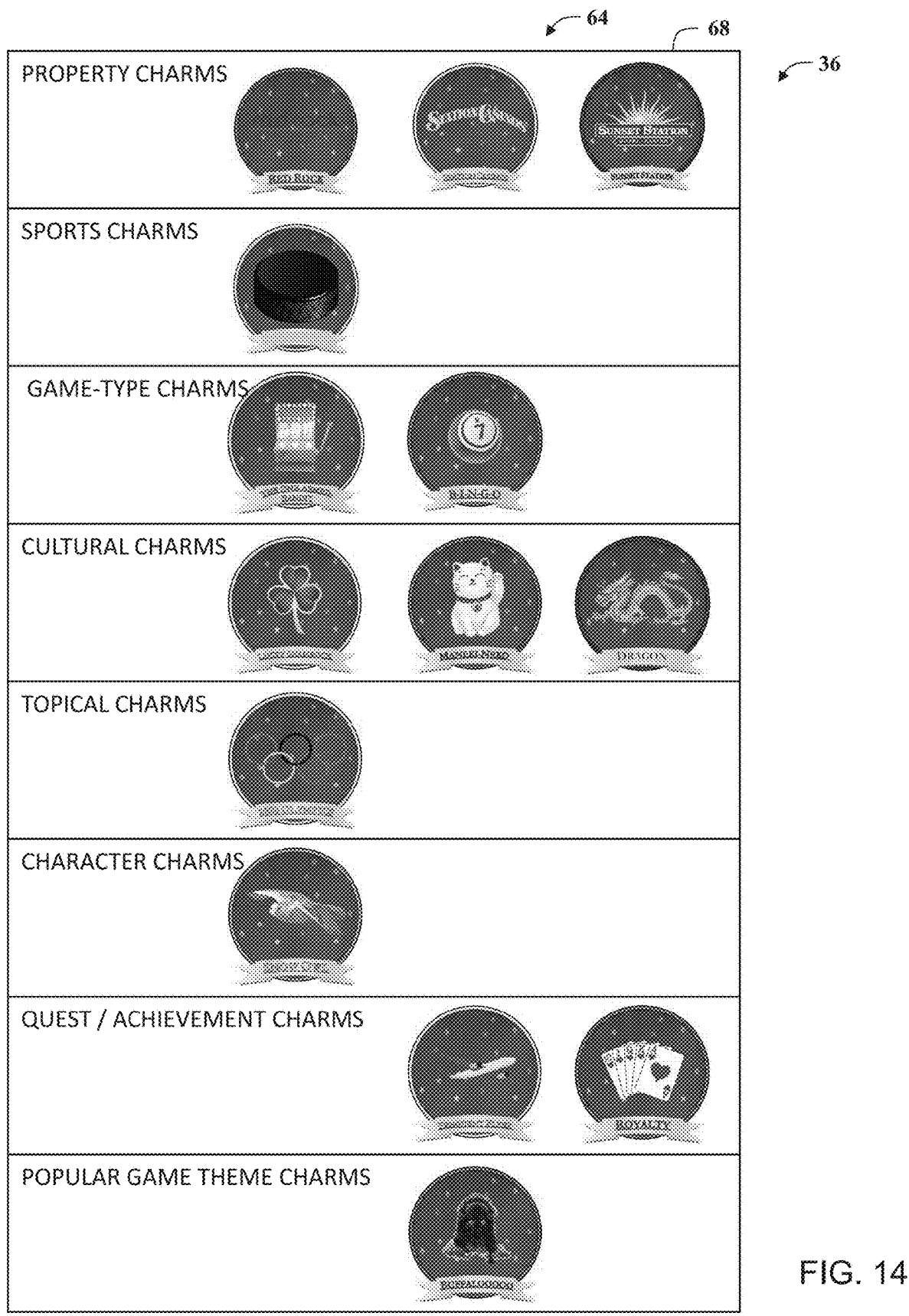
Figure 15:
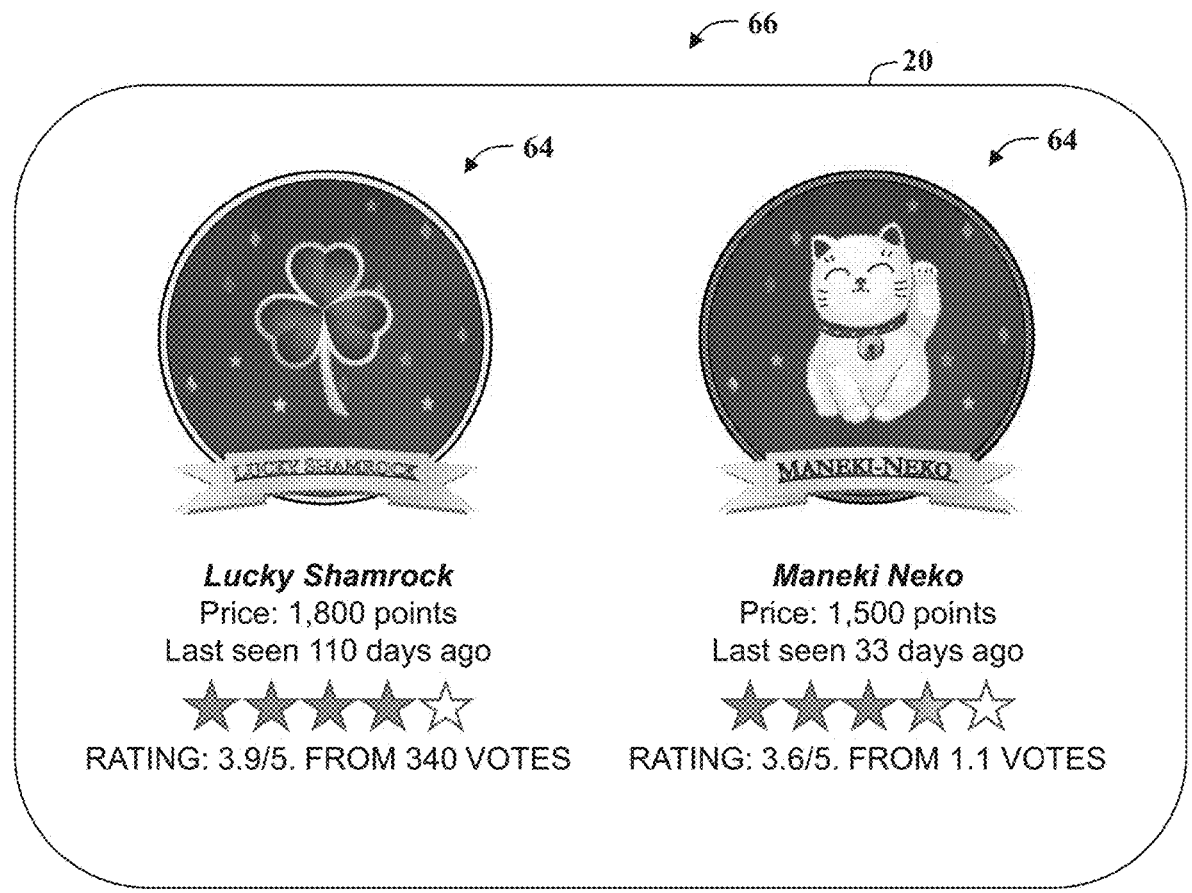
Figure 16:
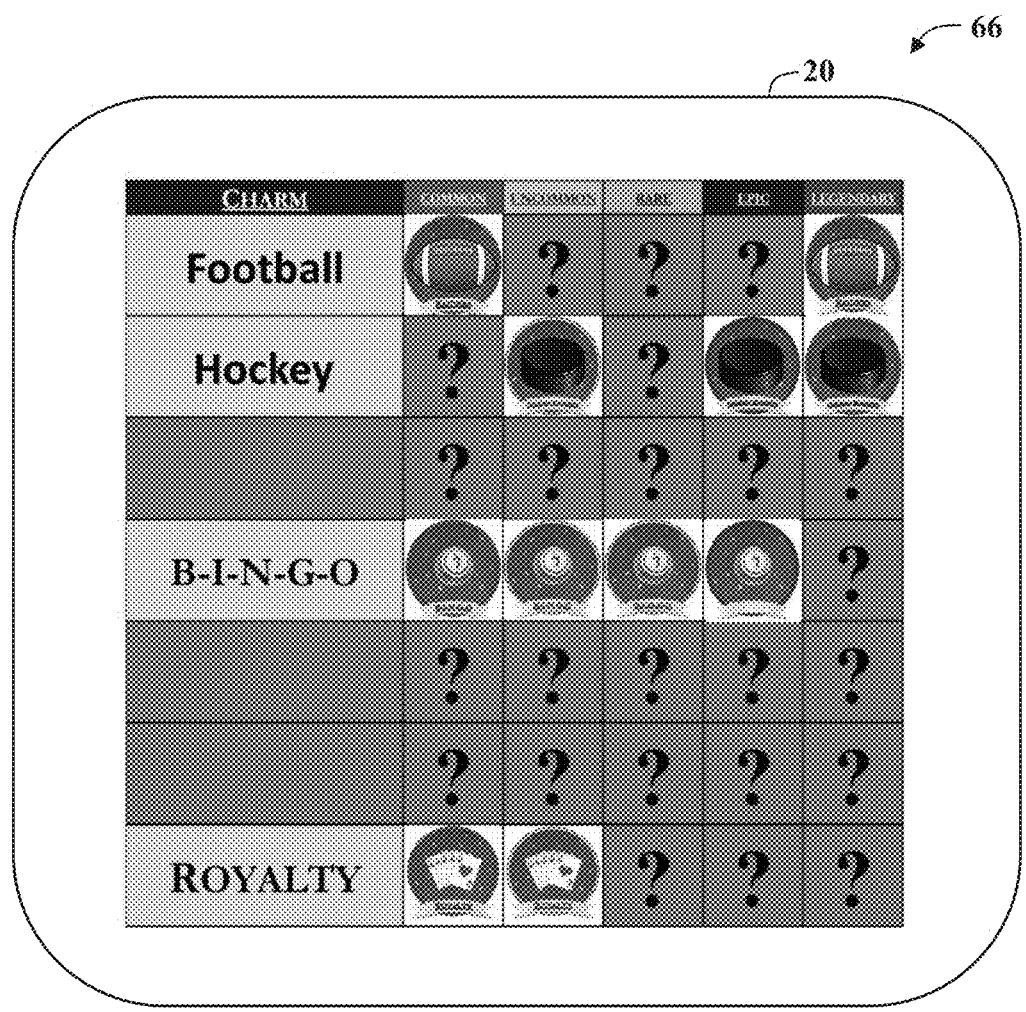
Figure 17:
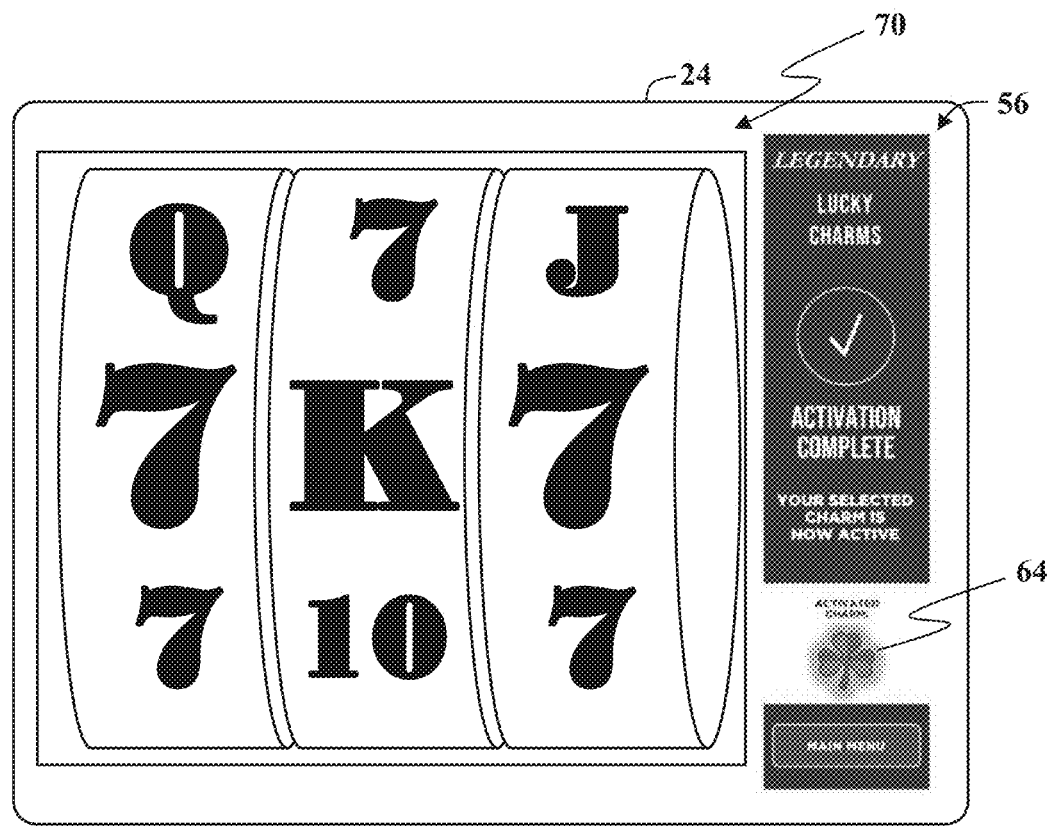
FIGS. 17-19 are illustrations of exemplary user interface screens that may be displayed by customer loyalty program computer system on gaming devices, according to embodiments of the present invention.

The STN Charms smart contract 46 implements the API through which charms are created and managed. The STN Charms smart contract is deployed to the blockchain system 34. All interactions with the STN Charms smart contract 46 are recorded in the blockchain and are part of the public blockchain record where the transactions can be reviewed or audited by all parties. For example, as shown in FIG. 12, the STN Charms smart contract 46 may mint a plurality of casino charm NFTs that are deployed to the blockchain ledger 44 including transition records indicating each casino charm NFTs as originally minted and/or owned by a casino gaming entity such as, for example, Station Casinos™ (shown as "STN" in FIG. 12). In some embodiments, the blockchain ledger 44 may include unique charm NFT IDs (shown as "Charm1NFT", "Charm2NFT", "Charm3NFT", etc.) associated with each minted casino charm NFTs.

Application Architecture: Loyalty Member-facing applications are built to interact with the STN Charms smart contract (see FIG. 4). An administration application 48 is used by the Station Casinos actor to mint and award new charms to Loyalty Members. A Marketplace application is used to allow Loyalty Members to buy new charms from Station Casinos or other members and/or to sell charms that they own with other members. As the Loyalty Members play games or make use of other services provided by Station Casinos, other systems will use the STN Charms smart contract to award members.

Loyalty Members/Patrons may enroll in the program using a membership application 52 (e.g., a website, mobile application, mobile website, etc.). This application will be where Loyalty Members can come to manage their membership information and update it if necessary. Members are able to view the charms that they have received using information available from the blockchain. Loyalty Members will enroll into the STN Charms program using the membership application.

A marketplace application is created to allow members to buy and/or sell casino charm NFTs. Charms may be advertised on the marketplace for purchase either by Station Casinos or other members. All transactions made through the marketplace are recorded in the blockchain 44.

The marketplace and loyalty member application will make use of third-party wallet software 54 to connect to the blockchain and interact with the STN Charms smart contract to allow users to store and manage casino charm NFTs. In some embodiments, the wallet software 54 may implement a custodial wallet that is owned and maintained by a casino gaming entity for storing ownership information associated with casino charm NFTs. The use of a custodial wallets allows patrons to buy/sell/receive casino charm NFTs without using a personal crypto wallet. In other embodiments, ownership information associated with casino charm NFTs may be held in individual wallets.

Service Window Architecture: In order to support displaying charm information on the service window 56 of gaming machines 24 (shown in FIGS. 17 and 27-30), a server-based web application 58 is created and deployed to serve HTML content to the service window. The server application will provide read-only query access to the blockchain to query charms awarded or points earned by the Loyalty Member. The information will also be used to query for detailed content about charms from a charm content database 60 using the STN Charms API 62. Images or other multimedia content (shown in FIGS. 13-16 and 31-33) are downloaded from the charm content database 60 over HTTPS through hyperlink URLs returned by the STN Charms API.

The Service Window Server 58 will authenticate to the blockchain using a limited account that supports read-only access, but not execution of transactions. The account will not have any assets of its own and will have limited funds if necessary for performing the query operations against the STN Charms service contract.

This architecture assumes that the Loyalty Member has been authenticated and can be identified using an external mechanism. For example, in some embodiments, the Loyalty Member's identifying information may be injected into the Service Window Server and UI using a mechanism such as a query string parameter when the Service Window initiates the request to the Service Window Server for the content to display in the window.

STN Charms Smart Contract: The STN Charms smart contract implements the backend for the blockchain solution. The smart contract implements operations that record transactions in the blockchain. Transactions include minting charms; awarding charms to members; and/or buying or selling charms.

The STN Charms smart contract is based on the ERC-721 standard for non-fungible tokens1. ERC-721 provides the basic functions for use by the marketplace to transfer ownership of charms as part of buying, selling, trading, or gifting operations. The STN Charms smart contract enhances ERC-721 to add additional options of awarding members points and minting new charms. In other embodiments, the STN Charms smart contract may implement the ERC1155 multi token standard, and/or any suitable standard for deployment of non-fungible token types.

Authentication with the STN Charms smart contract occurs using standard public key cryptographic technology. In one embodiment, both Station Casinos and Loyalty Members will have unique accounts (e. g. wallets) on the blockchain with associated private keys that are used to digitally sign requests sent to the smart contract. When interacting with the blockchain through a web application such as the marketplace, users may be required to have an acceptable third-party wallet application installed that provides an API for the web application to communicate with the blockchain on behalf of the Loyalty Member. In other embodiments, the system 10 may use a custodial wallet owned by the casino entity that may be used to facilitate transactions associated with NFTs on the blockchain system 34.

STN Charms API: The STN Charms API is used to manage charms-related content and other off-chain data for the STN Charms program. The STN Charms API is implemented as a REST API over the HTTP protocol. The STN Charms API is intended to augment and complete the STN Charms Smart Contract by storing and retrieving information that is not necessary to be persisted in the blockchain.

The primary responsibilities for the STN Charms API are: Serve data, images, and other media about charms to be displayed in client applications; Store marketplace data including which charms are for sale; and Store other Loyalty Member information not included in blockchain or CRM.

Authentication and authorization at the API level are performed through JSON Web Tokens (JWTs) that are issued by an (undetermined) authentication service supporting the OAuth 2.0 and OpenID Connect protocols. The authentication service should have a trust relationship with the STN Charms solution. The actual method of authenticating users is not specified in this document.

The STN Charms API should be considered secondary to the Smart Contract. The information stored in the blockchain ledger is the system of record. The information that is available through the STN Charms API is supplementary. For example, a charm is referenced by an ID that is created and managed through a blockchain transaction. The STN Charms API stores content about the charm that is intended for user consumption, but the data does not have its own identity apart from the blockchain representation of the charm.

Operations available from the STN Charms API include: downloading descriptions, logos, images, or links to videos related to charms that are awarded to users; the list of charms that are being offered for sale in the marketplace and at what price the charms are being offered for sale; additional profile information about a Loyalty Member that is kept in neither the blockchain nor CRM service; the list of levels and how many points are required to achieve each level; metadata about quests including content that should be presented to the Loyalty Member to help them to complete the quest.

Referring to FIGS. 13-16 and 31-33, in some embodiments, the system 12 is programmed to generate a plurality of casino charm NFTs 36. Each casino charm NFT 36 may be associated with one or more Charm Categories.

Property Charms: Property charms would be given as a reward for loyalty and play at a certain property, with companywide play earning Stations' charms.

Sports Charms: Sports charms would be earned via special events and by playing at casino properties on the team's gameday.

Gametypes Charms: Gametype charms are earned by earning different thresholds of experience on a certain gametype.

Cultural Charms: Cultural charms are earned through purchasing or by playing on certain 'Charm Days', such as St. Patrick's Day for a special shamrock charm.

Topical Charms: Topical charms range from a popular TV character to a pint of beer. These are typically earned as prizes by levelling up or by purchasing from the charm shop.

Quest/Achievement Charms: Charms earned from questing are the result of completing certain tasks and missions. These can vary from a certain number of visits, hitting a certain type of bet, playing various gametypes, etc. In the examples discussed herein, the first charm would be for playing a certain amount of times in a time frame and the second would be a charm earned for hitting various quantities of Royal Flushes.

Popular Game Theme Charms: These charms would be earned by playing a certain theme—such as Buffalo or Lightning Link.

The system 12 may also implement a Charm Book (shown in FIG. 16) A guest's charm book is akin to their trophy room—it is a consolidation of all of the charms they have earned so far (and all of the charms they have yet to earn as well). The charm book serves as a great tool for bragging rights.

Charm Creation & Rarity: The foundation of Non-Fungible Tokens is that they are non-replaceable, indivisible, and virtually impossible to be tampered with. From the moment of their creation there is a finite number of that NFT, meaning they are not susceptible to inflation, which essentially guarantees their value can only increase over time.

Upon creation, a first edition version of each Charm can be kept to strategically implement to maximize each Charm's potential value. For example, as shown in FIG. 9, the system 12 may generate Charms separated into five tiers of rarity that coincide with current Boarding Pass status levels and correspond with their respective color identifiers. Strategic scarcity is fundamental to the Charm economy to ensure incentives for all types of guests. A plethora of 'Common' Charms are needed to ensure new guests receive several Charms shortly after joining. After acquiring several lower level Charms and completing quests and achievements, guests would begin to receive fewer Charms as they become more scarce and sought after.

Earning Charms: The system 12 may be programmed to allow Charms to be obtained through a variety of methods shown in FIG. 10.

The system 12 may also allow guests to earn Charms through Quests. Quests can be structured in a variety of ways, as shown in FIG. 11.

Charm Scarcity: By ensuring the proper amount of scarcity of each Charm, the system 12 provides a vast spectrum of Charm value to ensure that no guest is priced out of the Charm Market. The Charm Market would be tied to their Charm Account and managed on their mobile devices. This allows guests to buy and sell Charms amongst themselves. Due to the finite nature of NFTs upon their creation, immediate scarcity may be created on Event Charms. An example of this would be giving away a Legendary Event Charm for Chairman guests that play a certain amount at special event. If only 100 Charms are issued, there would never be another chance to earn that Charm, ensuring that those 100 Charms would be rare for perpetuity. To actively promote and incentivize guests to buy/sell as frequently as possible, Quests that can only be completed by having a certain amount of buy/sell transactions completed may be used.

Charm Purchasing: In addition to earning and trading, guests can acquire charms by purchasing them through a daily gift shop using patron loyalty points, e.g., Boarding Pass™ points (shown in FIGS. 15 and 35). Five charms would be available for purchase in the shop for a 24-hour window before being rotated out for another set of five charms. By implementing a 'last seen' feature for each charm, demand may increase for charms that normally would not be heavily sought after. Newly minted casino charm NFTs may also be dropped into the daily gift shop for purchase by casino patrons via patron loyalty points.

Figure 18:

Charm Visibility: One of the keys to STN Charms' success is being able to tap into the psychology of 'Keeping Up with the Joneses'. The more visibility on the Charms, the more likely guests will view Charms as a status symbol. This concept was effective for current loyalty program but over time there has been a status level inflation and being a Chairman does not provide the same sense of exclusivity as it used to. Some of the methods of promoting the social aspect of STN Charms through Charm visibility are: Charm Activation Visible on Machine (shown in FIGS. 18 and 29); and RGB Bulb in Candle—Color of Charm (shown in FIG. 18). By highlighting the 'rarity' of the guest's Charm through the candle, the system 12 can provide better guest service to high end guests while also driving a sense of aspiration for guests that do not have a Legendary Charm.

Guest Experience: The system 12 provides an enhanced guest experience by generating and displaying a User Interface to allow: Activating a charm on a slot machine; Buying/selling charms with another guest; and/or Purchasing charms from the daily shop.

The system 12 includes a Technical Architecture including: Service Window/Banner; Guests' NFT Wallet; Trading Platform; and Shop Platform.

Figure 19:
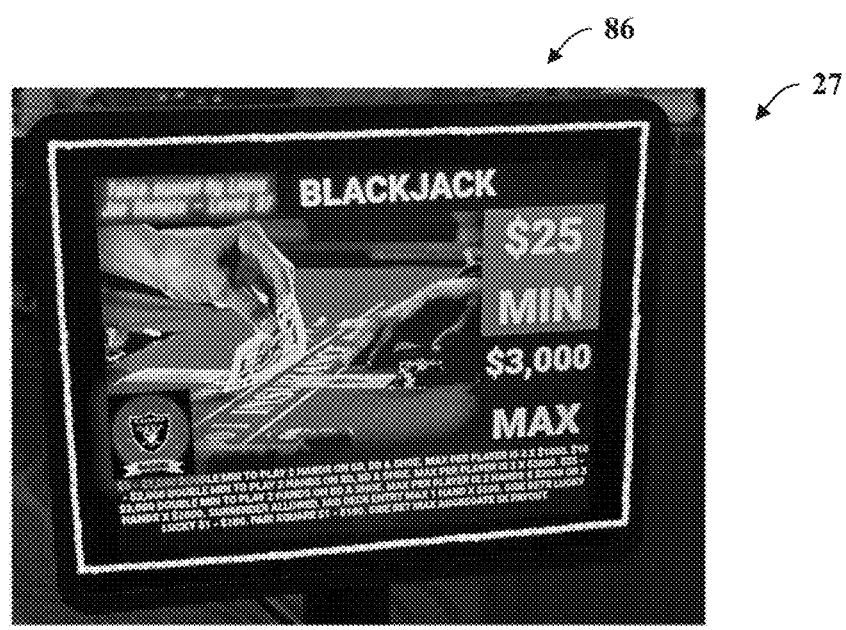
Figure 20:
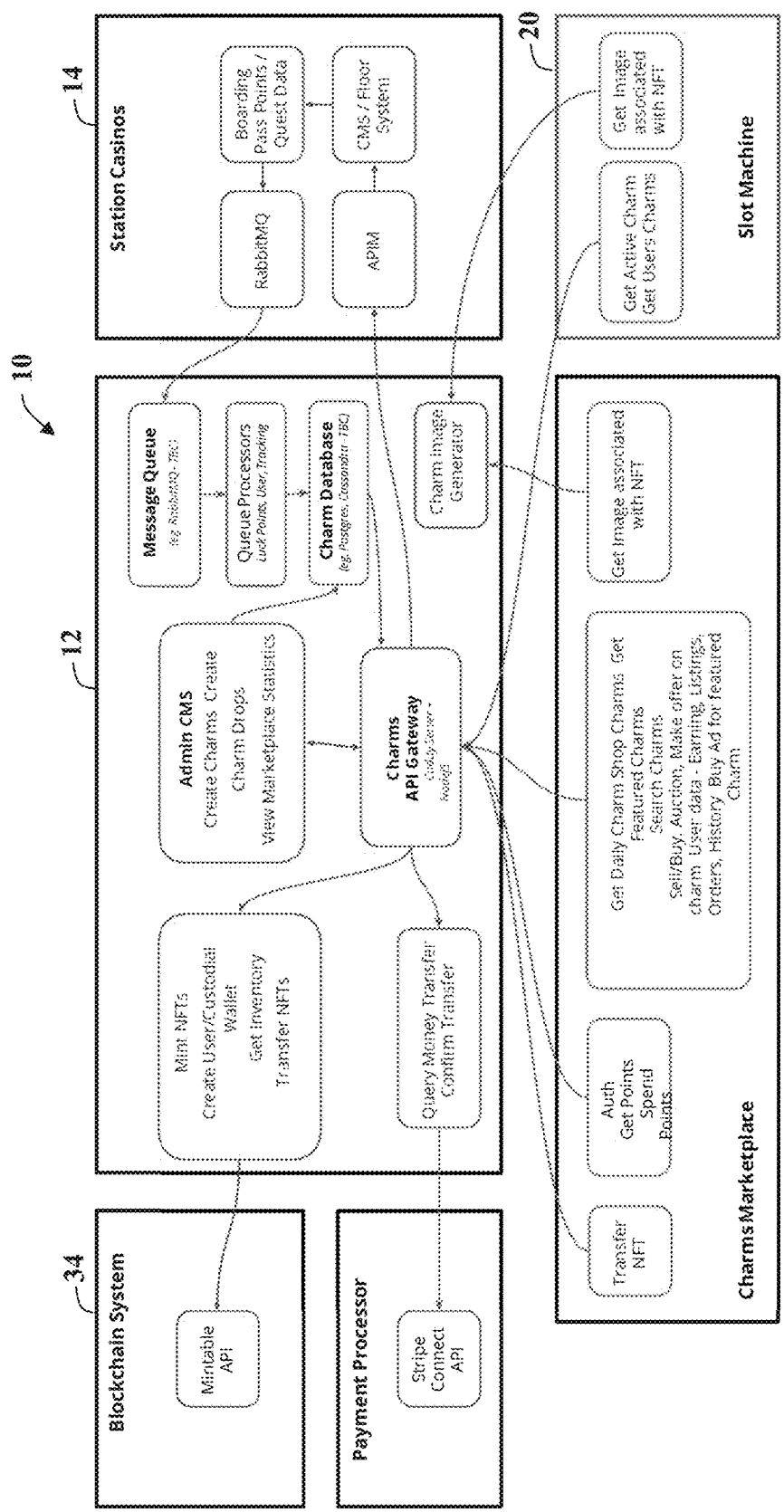
FIG. 20 is another schematic diagram of networked computer system shown in FIG. 1 for displaying images associated with NFTs on gaming devices located within casino properties, according to embodiments of the present invention.

The system 12 may also display Charms associated with Table Games—King of the Hill. Just as different guests gravitate towards certain games and gametypes, their motivations are different as well as the various levers that may be used to entice these guests to play. In Table Games, the 'keeping up with the Jones' is largely regulated by table limits. There is also significantly less space to work with as far as displaying any form of charm display. For a variety of reasons, a 'King of the Hill' style charm display is most likely the best path forward. The guest at the table who is playing the highest level charm will 'own' the table—every minute that the guest owns that table, they are earning luck points and/or increasing a luck value associated with their casino charm NFT. This will likely have a large impact on dead games that frequently sit without a single guest on them (since any guest that hops on one of those tables would automatically 'own' the table). For example, as shown in FIG. 19, the system 12 may display guest charms on table game limit signs. In some embodiments, the system 12 may display an image of the highest level casino charm NFT associated with a patron seated at a table game. In other embodiments, the system 12 may display a charm leader board on the table game display systems 27 showing a ranked list of casino charm NFTs associated the players seated at a gaming table.

Benefits

I. Reduce Guest Reinvestment: Using Boarding Pass Points as the currency of STN Charms, significantly reduces point liability, and even have guests purchasing Boarding Pass Points outright solely for the ability to purchase a Charm that they desired.

II. Drive Incremental/Extended Play: Through various Quest completion criteria or Event Charms, the system can drive extra trips from guests. Guests would also be exposed to new gaming areas they might not typically visit.

III. Migrate Guests to Higher Hold Activity: Strategic Quest design would incentivize guests to play games or place bets that has a higher house advantage than what they might typically play. As an example, a Quest might require a guest to hit a 'Panda' Baccarat side bet.

IV. Platform to Reach Younger Guests: The success of social gaming has given clear indication of the value of micro-transactions. Guests around the age of 21 are impaired more by their wallet than their time. They might be unable to come in and spend $200-$300 in a night, but are much more willing to spend $5-$10 to buy a charm or some other micro-transaction. This is great method to introduce them to products and get those guests in the database.

V. Enhanced Data Capture: The system 12 may see an increased number of guests in the database through STN Charms, and benefit from enhanced data capabilities. If guests utilizing the App on their mobile device have location services enabled, the system 12 will be able to track guest locations as they move around the casino to offer greatly enhanced insight into guest behavior. This would be a cost-free way to track guests' non-gaming behavior as well.

VI. Increased, Unpaid Exposure of Casino Brand Via Social Channels: As part of the social aspect of STN Charms, many guests would likely post images of a new charm they acquired. Certain Quests could also require social media posts in order to be completed.

Technology: The STN Charms full functionality may include: Creation of mobile device Application to manage Charms with digital wallet; Integration of NFT (Blockchain) into the service window and/or TFT display on a slot machine; Integration of NFT (Blockchain) into the banner on a slot machine; Implementation of a Charm Economy; Slot Machine Graphics reflecting chosen Charm; RGB Candle light speaking to Charm selection; Numerous graphics needed for creation of Charm graphics, Charm Luck value graphics, and more: Establishing desired scarcity; and Designing Quests.

Referring to FIGS. 8-12, in one embodiment, the customer loyalty program computer system 12 includes computer server having a processor programmed to execute algorithms 200-600 to display animated sequences of computer generated images of casino charm NFTs 64 (shown in FIGS. 27-40) on the display devices of gaming devices 20. For example, in method step 202, the processor 12 detects a loyalty member login request at a gaming device 20. In some embodiments, the processor 12 may receive a loyalty club member login request signal from a player tracking server 16 indicating a request from a patron to initiate a gaming session at a corresponding gaming device 20. For example, the player tracking server 16 may detect the insertion of a player loyalty club card into a card reader associated with an EGM 24 and receive a signal including a patron ID that is read by from the player loyalty club card from the card reader. In other embodiments, the player tracking server 16 may receive a login request from a player's mobile device 28 including a patron ID and/or a gaming device ID associated with a corresponding EGM 24. The player tracking server 16 may also receive the login request from the EGM 24 including a patron ID wirelessly received by the EGM 24 from a player's mobile device 28.

In method step 204, upon receiving the loyalty club member login request from the patron, the processor 12 queries the blockchain system 34 to identify casino charm NFTs currently owned by the patron. For example, in some embodiments, the processor 12 may query the STN Charms smart contract 46 to identify transitions stored in the blockchain system 34 to identify casino charm NFTs 64 associated with the patron ID indicating ownership of the identified casino charm NFTs 64 by the patron. In other embodiments, the processor 12 may query the custodial wallet 54 to identify casino charm NFTs 64 associated with the patron ID In method step 206, the processor 12 queries the STN Charms smart contract 46 to identify transitions stored in the blockchain system 34 to identify casino charm NFTs 64 currently owned by the casino gaming entity (shown as "STN" in FIG. 12).

In method step 208, the processor 12 queries the charm content database 60 to retrieve image data associated with identified casino charm NFTs 64 owned by the patron using the STN Charms API 62. The processor 12 may also query the charm content database 60 to retrieve image data associated with identified casino charm NFTs 64 owned by the casino gaming entity.

In method step 210, the processor 12 uses the retrieved image data to render images of the casino charm NFTs 64 on a charm selection screens 66 (shown in FIGS. 15-16 and 27-30) displayed on the corresponding gaming device 20. In some embodiments, the processor 12 may access casino charm NFT data files 68 (shown in FIG. 23) stored in database 60 to retrieve additional information associated with the casino charm NFTs 64. For example the casino charm NFT data files 68 may include a plurality of records associated with casino charm NFTs 64 including, but not limited to, corresponding charm NFT ID, charm luck value, charm categories, charm rarity, loyalty point purchase price, etc. The processor 12 may then render the charm selection screens 66 to include images of the casino charm NFTs 64 including a category, a rarity, and/or a loyalty point purchase price. The processor 12 may also enable a patron to purchase casino charm NFTs 64 owned by the casino gaming entity using loyalty points via the charm selection screen 66.

In method step 212, the processor 12 receives a patron's selection of a casino charm NFTs 64 owned by the patron via the charm selection screen 66 and renders the image of the selected casino charm NFTs 64 on a game screen 70 (shown in FIGS. 27-30) being displayed on the gaming device 20. For example, the processor 12 may display the selected casino charm NFT 64 in the service window 56 of the gaming device 20.

Figure 21:
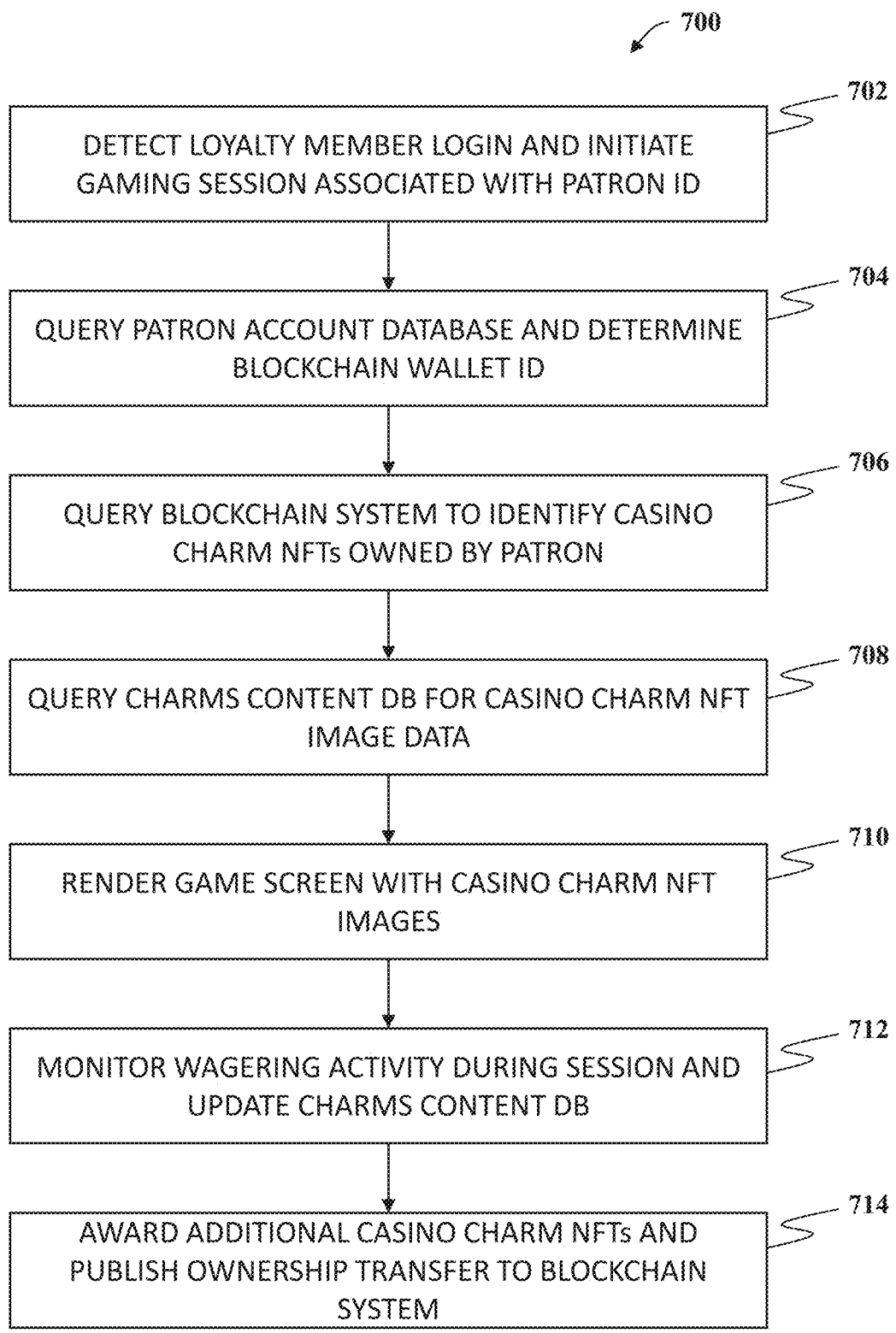
FIG. 21 is a flowchart illustrating an algorithm executed by the customer loyalty program computer system for displaying images associated with NFTs on gaming devices located within casino properties, according to embodiments of the present invention.
Figure 27:
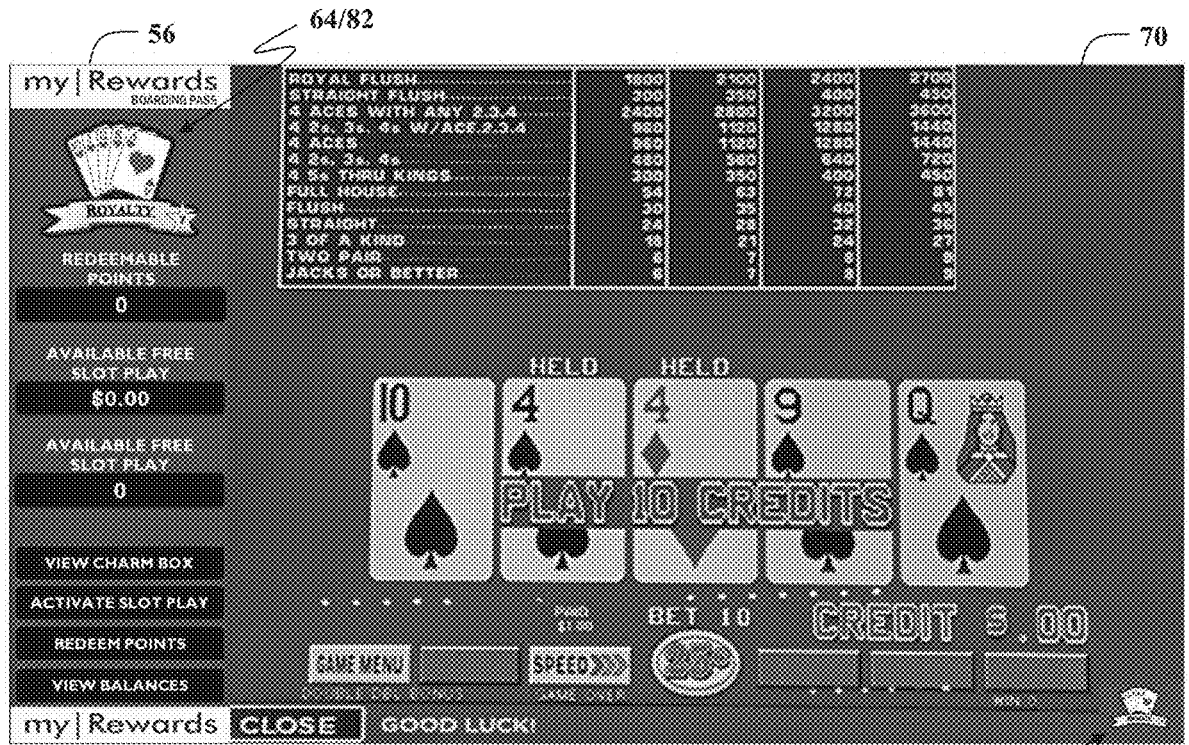
FIGS. 27-40 are illustrations of exemplary animated sequences of computer-generated images displayed on graphic user interface screens that may be displayed by customer loyalty program computer system on gaming devices, according to embodiments of the present invention.
Figure 28:

FIG. 21 illustrates algorithm 700 that may be executed by the customer loyalty program computer system 12 to display an animated sequence of computer-generated images of casino charm NFTs 64 on a display device of a corresponding gaming device 20. The algorithm include a plurality of steps. Each algorithm step may be performed independently of, or in combination with, other method steps. Portions of the algorithms may be performed by any one of, or any combination of, the components of the system 10. FIGS. 22-26 illustrate exemplary data files that may be used by the customer loyalty program computer system when executing algorithm 700.

In method step 702, a processor 12 receives a request to initiate a gaming session by a loyalty member/player/patron at a corresponding gaming device. For example, in some embodiments, the processor 12 may receive a gaming session request from a player tracking server 16 including a patron ID 74 read from a player loyalty club card or a mobile device 28 and a gaming device ID associated with a corresponding EGM 24. Upon receiving the patron ID, the processor 12 may query the casino management system server 14 to verify a patron account record 72 (shown in FIG. 22) associated with the received patron ID 74 is stored in a patron account database managed by the casino management system server 14. Upon receiving a verification of an associated patron account record 72, the customer loyalty program computer server may the initiate a gaming session at the corresponding EGM 24 and generate a corresponding gaming session record 76 (shown in FIG. 24).

In method step 704, the processor 12 queries the patron account database to determine a blockchain user account ID 78 associated with the received patron ID. For example, the processor 12 may query the casino management system server 14 to retrieve the patron account record 72 associated with the received patron ID and identify the blockchain user account ID 78 associated with the received patron ID.

In method step 706, upon receiving the identified blockchain user account ID 78 associated with the received patron ID, the processor 12 then queries the blockchain system 34 to identify a casino charm NFT 64 owned by the blockchain user account ID 78. For example, the processor 12 may query the STN Charms smart contract 46 to identify transitions stored in the blockchain system 34 to identify casino charm NFTs 64 owned by the identified blockchain user account ID 78. The blockchain user account ID 78 may include a blockchain wallet ID, Uniform Resource Indicator (URI), or similar identification code, to identify a unique user/owner on the blockchain system 34. In some embodiments, the blockchain user account ID 78 may include a private key that may be used to facilitate transactions via the custodial wallet 54 to facilitate transitions associated with the casino charm NFTs and/or verify ownership of casino charm NFTs.

In method step 708, the processor 12 queries the charms content database 60 to retrieve object image data associated with the identified casino charm NFT 64. For example, in some embodiments, the processor 12 may query the charm content database 60 using the STN Charms API 62 to retrieve object image data associated with the identified casino charm NFT 64. The charm content database 60 may include casino charm NFT data files 68 that include information associated with each casino charm NFT 64 including, for example, a charm NFT ID 80 identifying the casino charm NFT 64, object image data associated with a charm card image 82 and a charm icon image 84 (shown in FIGS. 27, 30, and 31-33), a production number associate each casino charm NFT indicating a total number of minted charm NFTs included in a class or category and the production number of the corresponding casino charm NFT with the class/category, a wagering activity including total coin-out and/or total taxable jackpot amount, a luck level, and a bonus feature.

In some embodiments, the STN Charms smart contract 46 may mint each casino charm NFT 64 deployed to the blockchain ledger 44 to include metadata associated with corresponding object image data, production number, and/or luck level. For example, each STN Charms smart contract 46 may mint each casino charm NFT 64 to include a Uniform Resource Indicator (URI) that includes the corresponding charm NFT ID and points to corresponding information stored in the charm content database 60. For example, each casino charm NFT 64 may include a Uniform Resource Locator (URL) including a web address for locating and retrieving information resources from the charm content database 60 including object image data, production number, and/or luck level associated with the casino charm NFT 64. In some embodiments, when the processor 12 queries the blockchain system 34 to identify a casino charm NFT 64 owned by the blockchain user account ID 78, the processor 12 may then access the URI included with the identified casino charm NFT 64 and access the corresponding object image data, production number, and/or luck level from the charm content database 60 based on metadata included in the retrieved casino charm NFT 64.

In method step 710, the processor 12 renders a game screen 70 on the corresponding EGM 24 including animated computer images of the identified casino charm NFT 64. For example, in some embodiments, the processor 12 may use the server-based web application 58 to serve HTML content to the EGM 24 to display the game screen 70 including a wagering game (e.g., slot reels, video poker, etc.) and the service window 56 being displayed on the EGM 24 (shown in FIGS. 27-30). The processor 12 uses the server application 58 to query detailed content about the casino charm NFTs 64 from the charm content database 60 using the STN Charms API 62. The charm image data 82 and 84 are downloaded from the charm content database 60 over HTTPS through hyperlink URLs returned by the STN Charms API 62 and used to render images associated with the identified casino charm NFT 64 on the service window 56 displayed ion the EGM 24. The processor 12 may also render the charm card image 82 of the casino charm NFT 64 on the service window 56 and render the charm icon image 84 of the casino charm NFT 64 overlaying a portion of the wagering game. In addition, during game play, the processor 12 may remove the service window 56 from the game screen 70 to enable more of the EGM display to be used to display the wagering game while continuing to display the charm icon image 84 of the casino charm NFT 64 on the game screen 70. By displaying an image of the casino charm NFT 64 on the game screen 70, the player is notified that the wagering activity incurred during the gaming session is being associated with the casino charm NFT 64 being displayed during the gaming session. In some embodiments, the charm icon image 84 may be displayed as an interactive 3-dimensional image that is responsive to a player's touch input on the touchscreen of the gaming device 20. For example, the charm card image 82 and/or the charm icon image 84 may be rendered as an animated Graphics Interchange Format (GIF) file, a Joint Photographic Experts Group (JPEG) file, Portable Network Graphic (PNG) file, and the like, which may animate (e.g., a 3D image spinning) when touched by a patron via the touchscreen.

The processor 12 may also implement the algorithm steps of querying the blockchain system 34 to verify the identified casino charm NFT 64 as originally owned by a casino gaming entity and rendering the image of the identified casino charm NFT 64 upon verifying the identified casino charm NFT 64 as originally owned by a casino gaming entity. In this way, the processor 12 implements additional security measures to ensure the casino charm NFT 64 being activated by the player was originally owned/minted by the casino gaming entity.

Figure 29:

In some embodiments, the processor 12 may be programmed to execute the algorithm including the steps of querying the blockchain system 34 to identify a plurality of casino charm NFTs owned by the blockchain user account ID 78, querying the charms content database 60 to retrieve image data associated with each of the plurality of casino charm NFTs owned by the blockchain user account ID 78, and rendering a charm selection screens 66 (shown in FIGS. 28-30) on the corresponding EGM including images of each casino charm NFT 64. The processor 12 may then allow a player to activate a casino charm NFT 64 on the EGM by receiving a player selection of a casino charm NFT via the charm selection screen 66 and rendering the game screen 70 on the corresponding EGM 24 including an image of the player selected casino charm NFT 64. In some embodiments, the processor 12 may render charm card images 82 of the player selected casino charm NFT 64 on the charm selection screen 66 to notify the player of the currently selected casino charm NFT 64. The processor 12 may also render charm icon images 84 of the other casino charm NFT 64 available for selection by the player, as shown in FIG. 29. Upon receiving the selection of casino charm NFT 64 by the player, the processor 12 activates the selected casino charm NFT 64 on the EGM and renders the charm card image 82 of the casino charm NFT 64 on the service window 56 and the charm icon image 84 of the casino charm NFT 64 overlaying a portion of the wagering game to notify the player that the wagering activity incurred during the gaming session is being associated with the casino charm NFT 64.

The processor 12 may also implement steps to enhance security of the casino charm NFTs 64 when rendering the charm selection screens 66 by querying the blockchain system 34 to identify the plurality of casino charm NFTs 64 owned by the blockchain user account ID 78 and querying the blockchain system 34 to verify each casino charm NFT 64 as originally owned by the casino gaming entity. The processor 12 may then query the charms content database 60 to retrieve object image data associated with each verified casino charm NFTs 64 owned by the blockchain user account ID 78 and render the charm selection screen 66 on the corresponding EGM including images of each verified casino charm NFT 64. The processor 12 may then receive a player's selection of a verified casino charm NFT 64 via the charm selection screen 66 and render the game screen 70 on the corresponding EGM including an image of the player selected casino charm NFT 64.

Figure 30:
Figure 31:
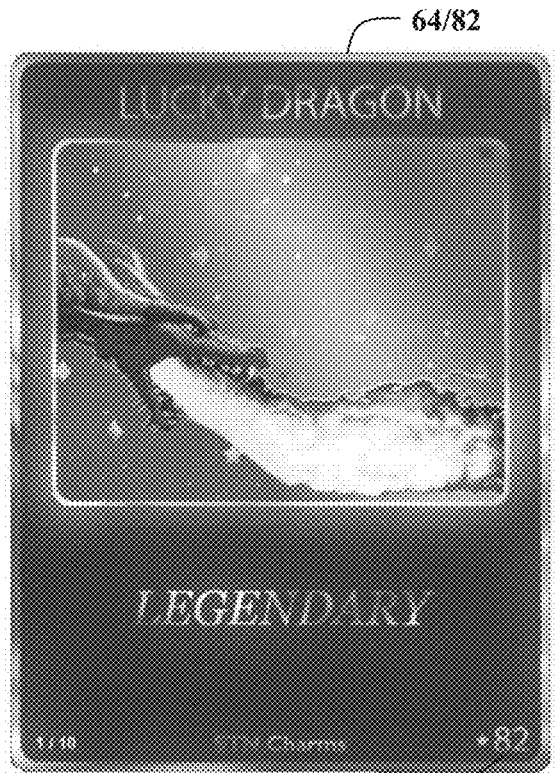
Figure 32:
Figure 33:
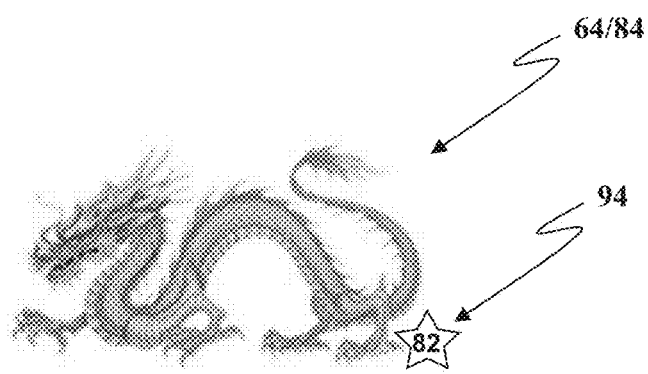
Figure 34:
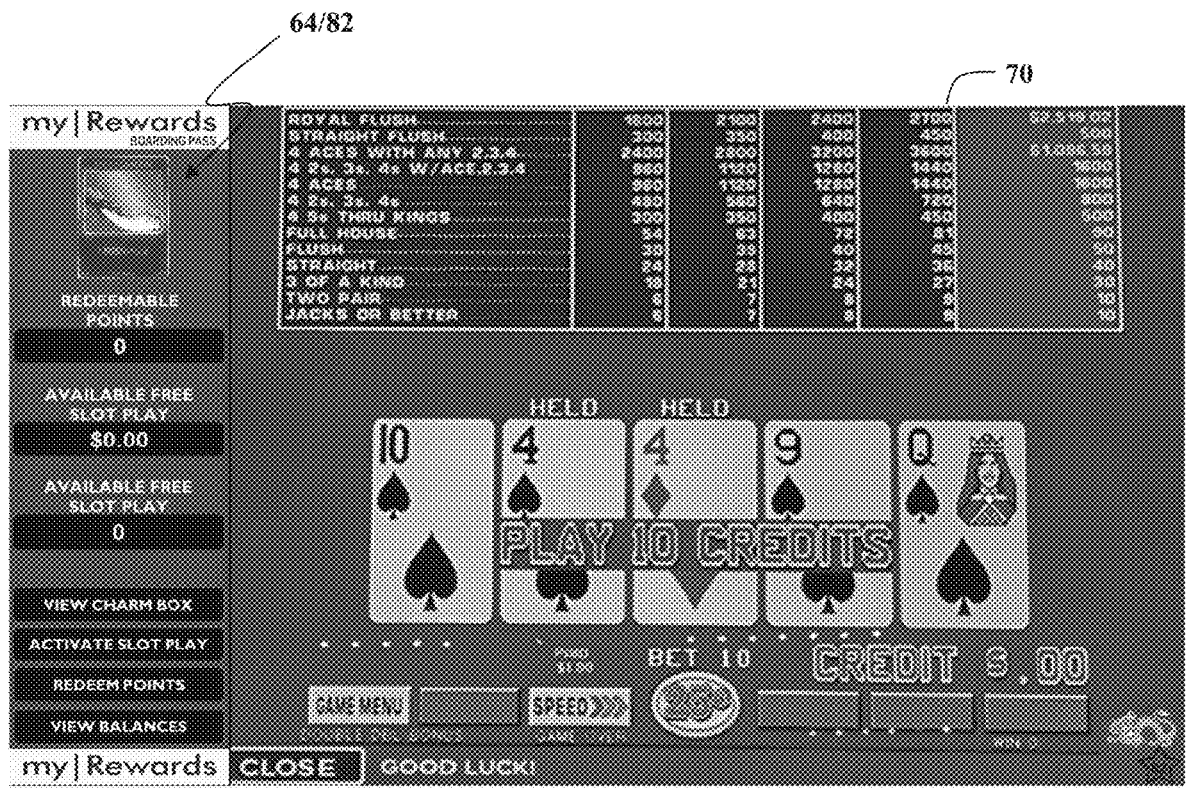
Figure 35:
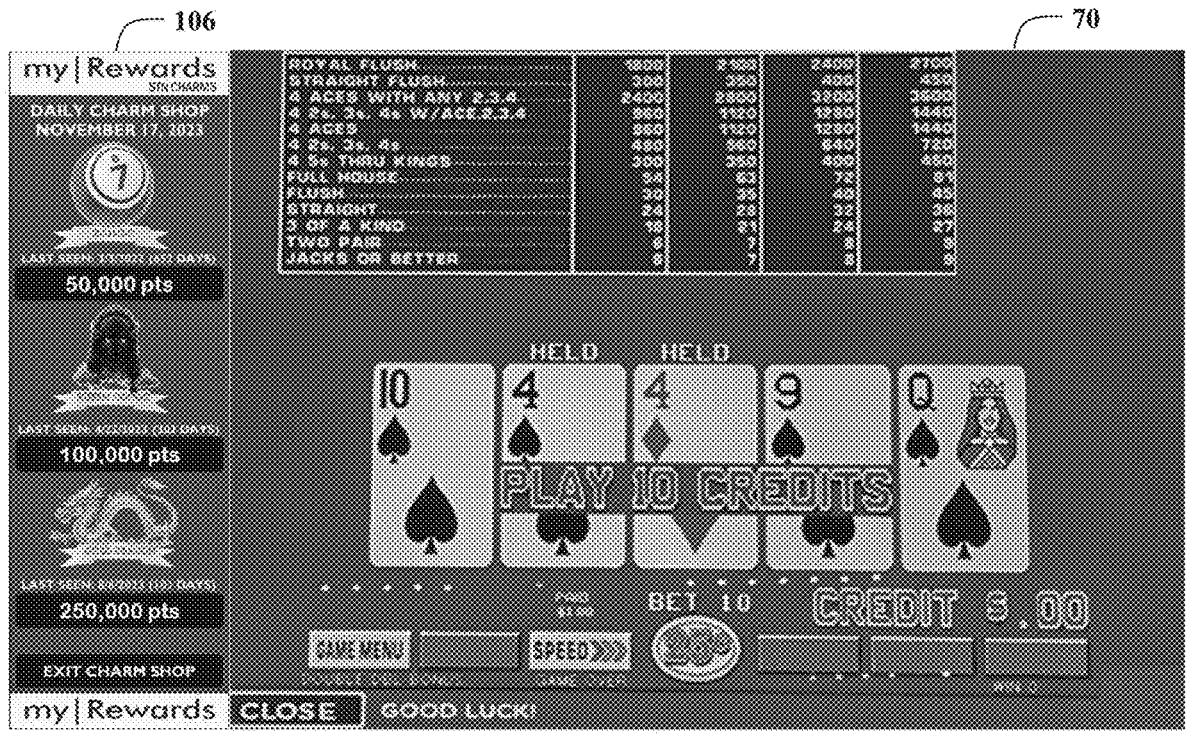
Figure 36:
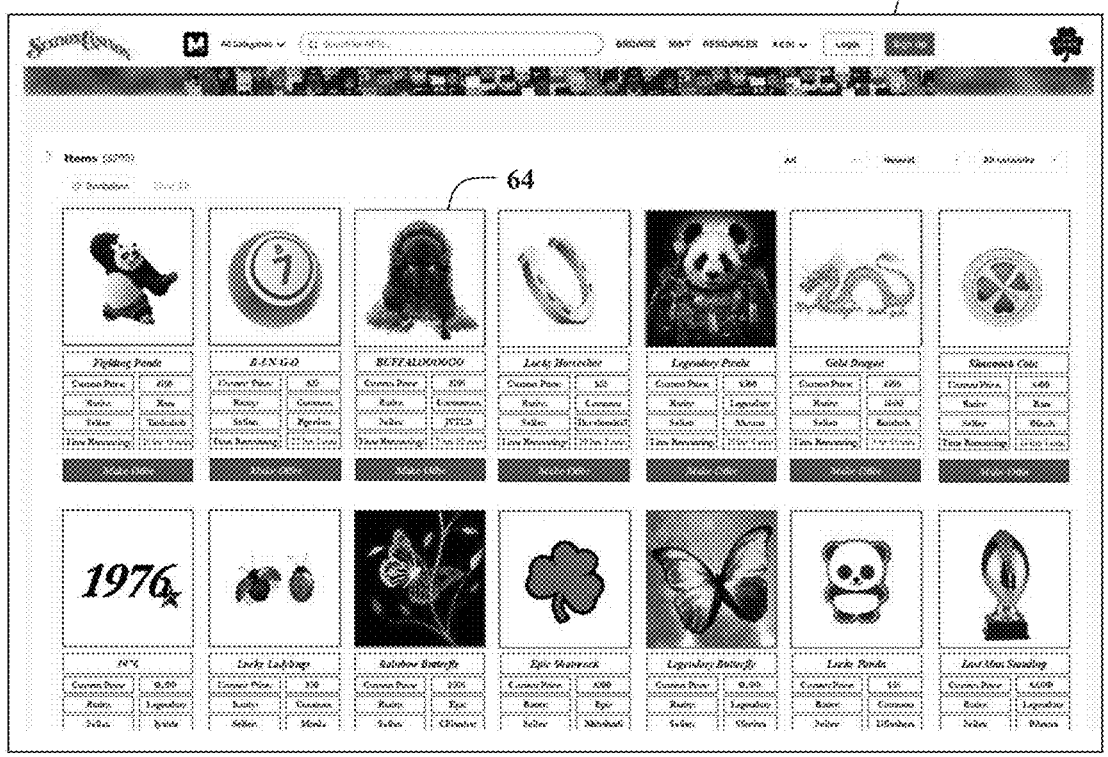
Figure 37:
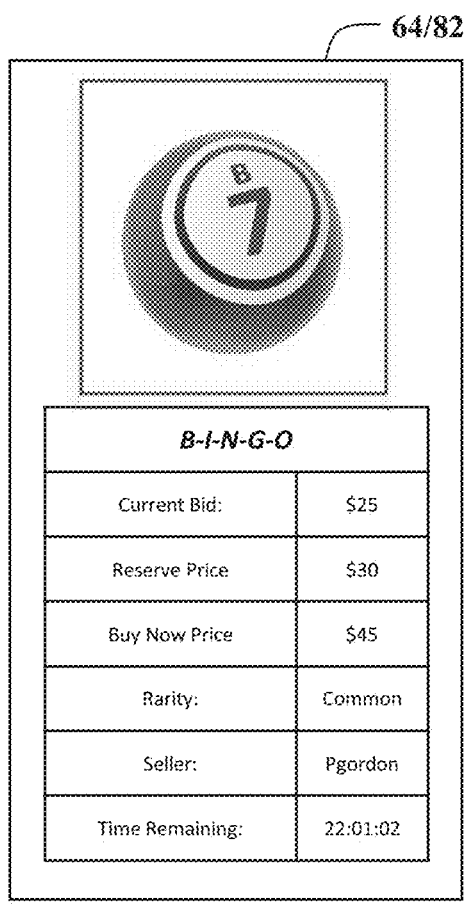
Figure 38:
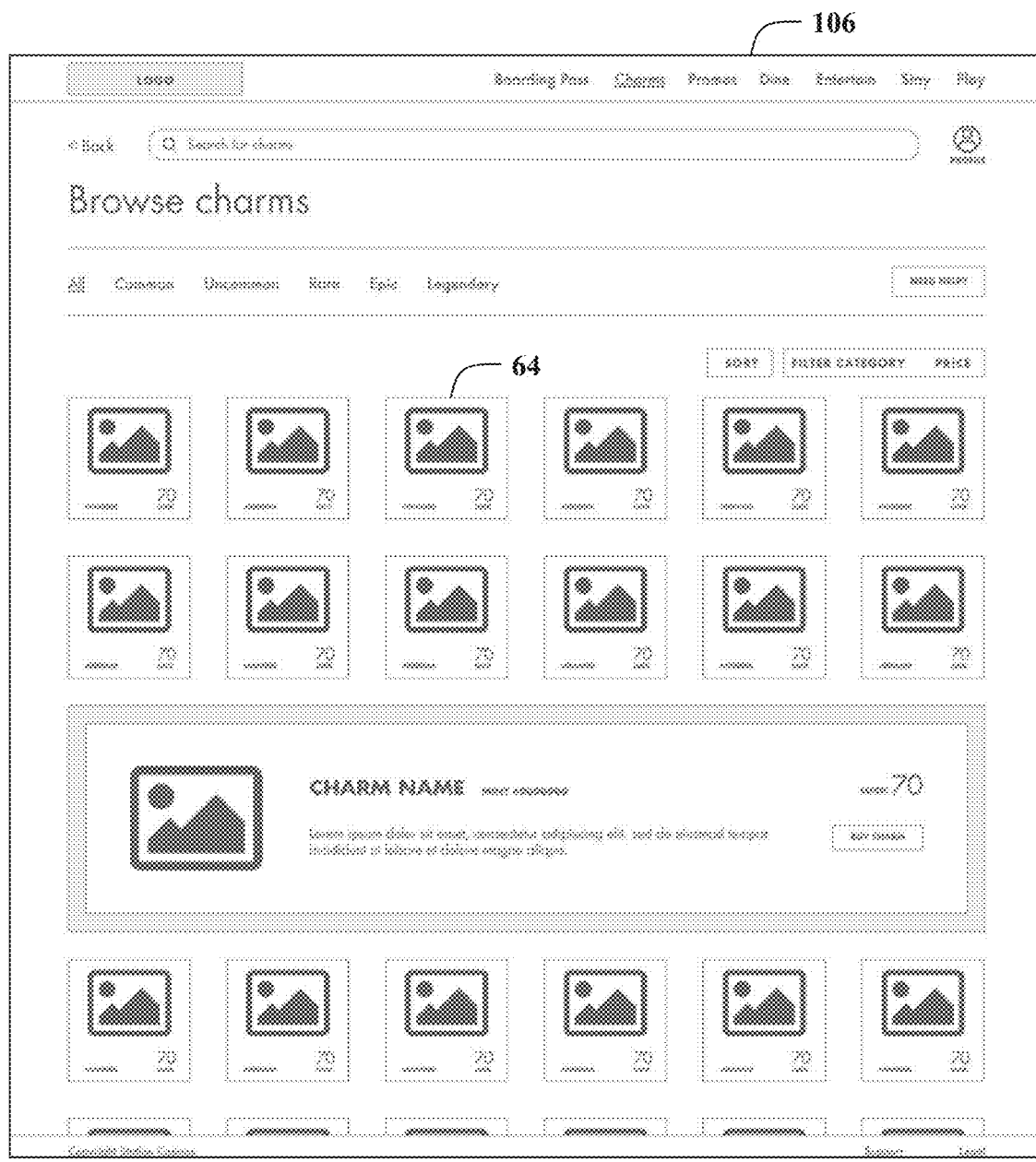
Figure 39:
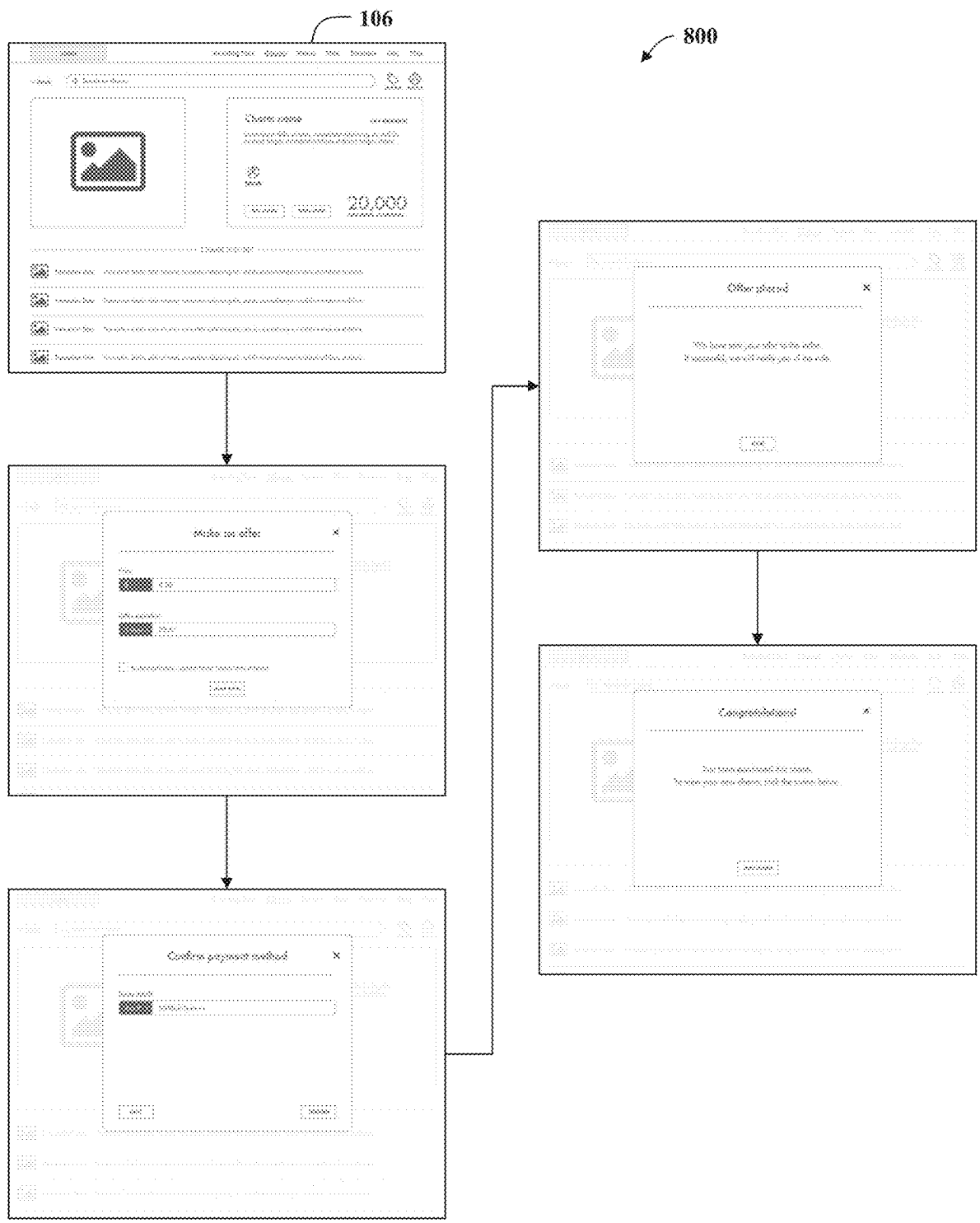
Figure 40:
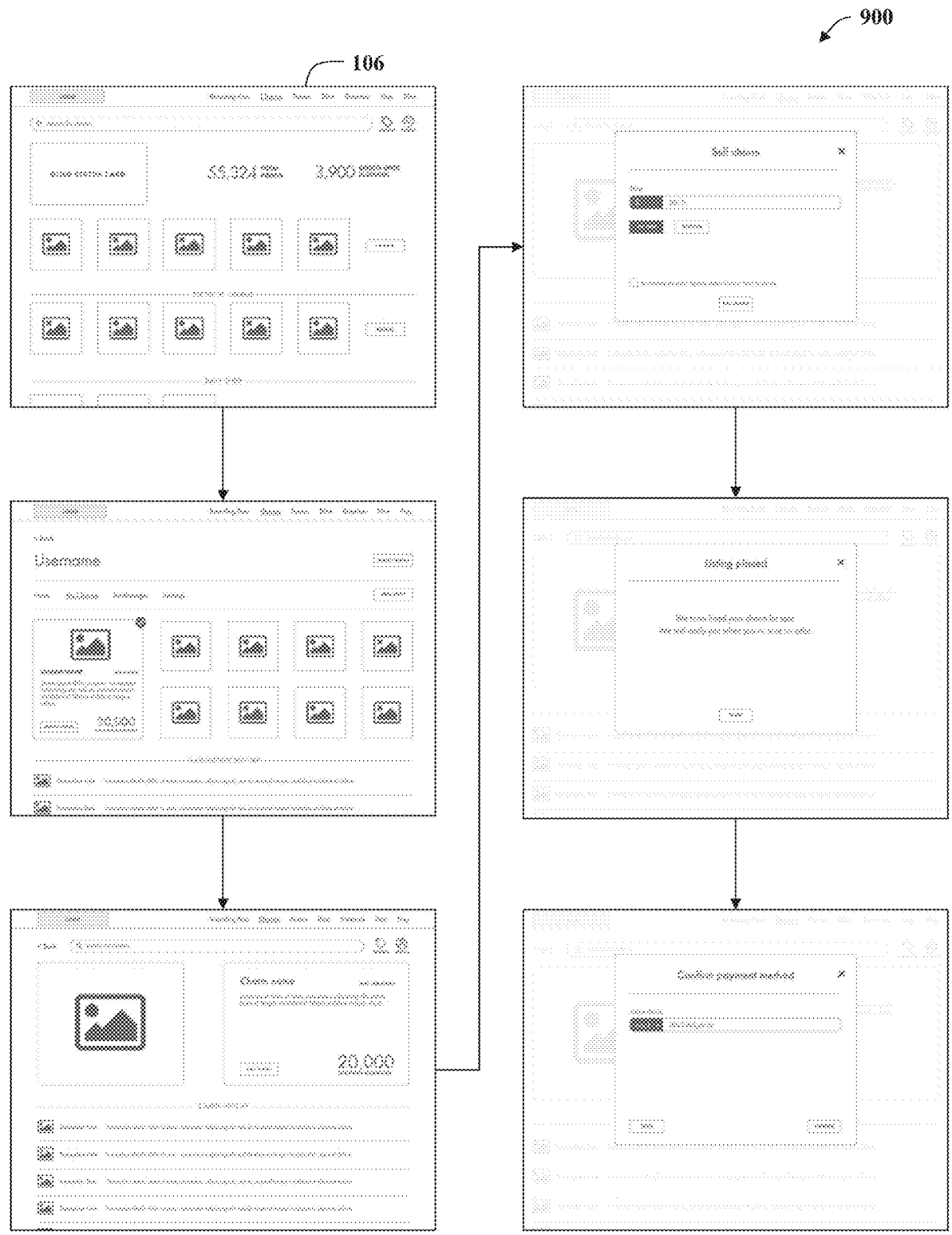

In some embodiments, the processor 12 may determine a bonus feature associated with the identified casino charm NFT 64 and initiate the determine bonus feature via the EGM 24. For example, in some embodiments, upon receiving the player's selection of the casino charm NFT 64, the processor 12 may query the casino charm NFT data files 68 to determine a bonus feature associated with the player selected casino charm NFT 64. The bonus feature may include, for example, an enhanced paytable, an enhanced EGM lighting feature (e.g., modifying a color of the RGB Bulb in EGM candle, displaying a charm on a table game display, a bonus game, and/or similar enhancements to game play and/or visual/audio displays associated with the gaming device 20. For example, as shown in FIG. 30, upon receiving the player's selection of the casino charm NFT 64, the processor 12 may initiate a bonus feature 86 including an adjustment to the base paytable/return to player (RTP) for the wagering game being played on the EGM 24 such as, for example, modifying a video poker paytable 88, such as changing a Full House payout from 35→40 credits (at 5 credits). In addition, having certain casino charm NFTs 64 active would adjust a reward/bonus/RTP via a secondary game such as, for example, unlock a bonus game like the Wheel of Fortune™ which was separate from the base game. In some embodiments, certain casino charms NFTs 64 that are associate with certain categories of Charms that would kick off a bonus event. For example, a certain Charm category would increase a video poker paytable. A full house might pay 35 credits with no Charm active, 36 credits with that category's common charm active, 37 with uncommon charm active, and 40 credits with the Legendary Charm active. Another example might be during a VGK™ game if a VGK™ Charm is active during a gaming session, the processor 12 may render a random hockey themed bonus game on the EGM 24.

In method step 712, the processor 12 associates the gaming session with the displayed casino charm NFT 64, monitors wagering activity occurring during the gaming session, and updates the charm content database 60 to modify casino charm NFT data files 68 associated with the displayed casino charm NFT 64 to include the monitored wagering activity. The wagering activity may include any activity conducted by the gaming device such as, for example, wagers placed/received, loyalty points used, games played, bonuses initiated and/or awarded, quest events such as hitting a Royal Flush or taxable jackpot, and the like. For example, in some embodiments, the processor 12 may initiate the gaming session by generating a unique gaming session record 76 (shown in FIG. 24) associated with the gaming session and associating the identified casino charm NFT 64 with the unique gaming session record 76. The gaming session record 76 may include the patron ID, date/time stamp, device ID identifying the EGM, property ID identifying the casino property in which the EGM is located, wagering activity and the charm NFT ID 80 identifying the casino charm NFT 64 activated during the gaming session. The processor 12 then monitors wagering activity conducted via the corresponding EGM during the gaming session and updates the charms content database 60 to include the monitored wagering activity conducting during the gaming session associated with the identified casino charm NFT. In some embodiments, the player tracking server 16 may monitor waging activity occurring during the gaming session and associate the monitored wagering activity with the casino charm NFT 64 being displayed on the game screen 70. The player tracking server 16 may then send information associated with the gaming session including the waging activity that occurred when the casino charm NFT 64 was displayed on the game screen 70 to the customer loyalty program computer server 12, which then updates the casino charm NFT data files 68 associated with the displayed casino charm NFT 64 to include the monitored wagering activity. In this way, the customer loyalty program computer server 12 monitors wagering activity that incurs when specific casino charm NFTs are displayed on the EGMs 24.

In method step 714, the processor 12 awards additional casino charm NFTs 64 to the player based on wagering activity occurring during the gaming session or cumulative wagering activities being performed by the player. For example, during the gaming session, the processor 12 may execute algorithms 300-500 (shown in FIGS. 9-11) and query a charm award data file 90 (shown in FIG. 25) to determine whether additional casino charm NFTs 64 should be awarded to the player based on monitored wagering activity. For example, charm award data file 90 may include information associated with a variety of wagering activities 92 that may be performed by players/patrons and associated casino charm NFTs 64 that may be awarded if the corresponding wagering activity 92 is achieved by the player. Upon determining that the corresponding wagering activity 92 has been achieved by the player, the processor 12 may query the STN Charms smart contract 46 to initiate a transaction transferring ownership of the awarded casino charm NFT 64 from the casino gaming entity to the player and record the transaction on the blockchain ledger 44.

In the illustrated embodiment, the processor 12 is also programmed to execute the algorithm including the steps of determining a charm luck value 94 associated with the identified casino charm NFT 64 and rendering the images 82, 84 of the identified casino charm NFT 64 including the charm luck value 94. For example, the processor 12 may query the charms content database 60 including the casino charm NFT data files 68 to retrieve the charm luck value 94 associated with the identified casino charm NFT 64 and rendering the images 82, 84 of the identified casino charm NFT 64 including the retrieved charm luck value 94. In addition, when rendering the charm selection screen 66, the processor 12 may query the casino charm NFT data files 68 to retrieve the charm luck value 94 associated with each casino charm NFT 64 owned by the player and display each casino charm NFT 64 with the corresponding charm luck value 94 on the charm selection screen 66. In this way, the player is notified of the charm luck value 94 associated with each casino charm NFT 64 prior to making a selection.

In some embodiments, the processor 12 may also determine the charm luck value 94 based on the wagering activity associated with a corresponding casino charm NFT 64. The processor 12 may query the charms content database 60 including the casino charm NFT data files 68 to retrieve wagering activity associated with the identified casino charm NFT 64 and determine the charm luck value 94 based on the wagering activity associated with the identified casino charm NFT 64. For example, the processor 12 may query the charms content database 60 to retrieve a total coin-out amount associated with the identified casino charm NFT 64 and determine the charm luck value 94 based on the total coin-out amount associated with the identified casino charm NFT 64. The processor 12 may also query the charms content database 60 to determine a taxable jackpot amount associated with the identified casino charm NFT 64 and determine the charm luck value 94 based on the total coin-out amount and the taxable jackpot amount (e.g., $1,200 or more) associated with the identified casino charm NFT 64.

In some embodiments, the processor 12 may determine the charm luck value by querying a charm luck data file 96 being stored in the charms content database 60 including a plurality of ranked charm luck levels 98 with each ranked charm luck level 98 including a total luck value 100. The processor 12 then identifies a highest ranked charm luck level 98 having a corresponding total luck value 100 equal to or less than a sum of the total coin-out amount and the taxable jackpot amount associated with the identified casino charm NFT 64 and displays the determined charm luck value 94 including the identified highest ranked charm luck level 98.

For example, the processor 12 may generate the charm luck data file 96 including each ranked charm luck level 98 including a corresponding numeric luck level value 98, a corresponding total luck value 100, a luck-to-next-level (LNLv) value 102, and a multiplier value 104. The multiplier value is determined based on the corresponding numeric luck value. The LNLv value is determined based on the multiplier value. The corresponding total luck value is determined as a sum of LNLv values associated with each lower ranked charm luck level 98. In some embodiments, the processor 12 calculates the multiplier value using the following equation:

$$M = e^{1+0.045x} \qquad \text{Equation 1:}$$

wherein:
M=the multiplier value;
x=the corresponding numeric luck value associated with the corresponding luck level.

The processor 12 may also calculate the corresponding LNLv value using the following equation:

$$\text{LNLv} = P*(1+((1/M)*2.2277)) \qquad \text{Equation 2:}$$

wherein:
LNLv=the corresponding LNLv value associated with the corresponding luck level;
P=a previous LNLv value associated with a next lower luck level; and
M=the multiplier value associated with the corresponding luck level.

In some embodiments, the processor 12 may also execute the administration application 48 to render a charms marketplace interface screen 106 on gaming devices 20 to allow patrons to sell charms that they own, or buy charms from other members. As the Loyalty Members play games or make use of other services provided by Station Casinos and earn points, other systems will use the STN Charms smart contract to award earned points to members/patrons/players. For example, the processor 12 may render the charms marketplace interface screen 106 and implement algorithms 800 and 900 (shown in FIGS. 39 and 40) to enable members/patrons/players to buy and/or sell casino charm NFTs 64.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed herein, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, MongoDB™ database engines which is a document storage solution, Oracle® Database, MySQL, IBM® Db2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A networked computer system for displaying images associated with non-fungible tokens (NFTs) on electronic gaming machines (EGMs), comprising:
   a player tracking device coupled to a corresponding EGM located within a casino property, the player tracking device configured to monitor wagering activity associated with the corresponding EGM; and
   a computer server coupled to the player tracking device and the corresponding EGM, the computer server including a processor programmed to execute an algorithm to display an animated sequence of computer-generated images on a display device of the corresponding EGM including the steps of:
   receiving a request to initiate a gaming session at the corresponding EGM from the player tracking device, the request including a patron ID identifying a player;
   querying a patron account database to determine a blockchain user account ID associated with the received patron ID;
   querying a blockchain system to identify a casino charm NFT owned by the blockchain user account ID;
   querying a charms content database to retrieve image data associated with the identified casino charm NFT;
   determining a charm luck value associated with the identified casino charm NFT indicating wagering activity associated with the identified casino charm NFT by:
   querying the charms content database to retrieve wagering activity associated with the identified casino charm NFT; and
   determining the charm luck value based on the wagering activity associated with the identified casino charm NFT; and
   rendering a game screen on the corresponding EGM displaying a wagering game and images of the identified casino charm NFT and the determined charm luck value.

2. The networked computer system of claim 1, wherein the processor is programmed to execute the algorithm including the steps of:
   querying the blockchain system to identify a plurality of casino charm NFTs owned by the blockchain user account ID;
   querying the charms content database to retrieve image data associated with each of the plurality of casino charm NFTs owned by the blockchain user account ID;
   rendering a charm selection screen on the corresponding EGM including images of each casino charm NFT;
   receiving a player selection of a casino charm NFT via the charm selection screen; and
   rendering an image of the player selected casino charm NFT on the game screen displayed on the corresponding EGM.

3. The networked computer system of claim 1, wherein the processor is programmed to execute the algorithm including the steps of:
   rendering the images of the identified casino charm NFT and the charm luck value on a lower portion of the game screen.

4. The networked computer system of claim 1, wherein the processor is programmed to execute the algorithm including the steps of:
   querying the blockchain system to verify the identified casino charm NFT as originally owned by a casino gaming entity; and
   rendering the image of the identified casino charm NFT upon verifying the identified casino charm NFT as originally owned by a casino gaming entity.

5. The networked computer system of claim 1, wherein the processor is programmed to execute the algorithm including the steps of:
   determining a bonus feature associated with the identified casino charm NFT; and
   initiating the determine bonus feature via the EGM.

6. The networked computer system of claim 1, wherein the processor is programmed to execute the algorithm including the steps of:
   receiving the request to initiate a gaming session including the patron ID being read from a player tracking card inserted into the player tracking device.

7. The networked computer system of claim 6, wherein the processor is programmed to execute the algorithm including the steps of:
  initiating the gaming session by generating a unique gaming session record associated with the gaming session and associating the identified casino charm NFT with the unique gaming session record;
  receiving monitored wagering activity conducted via the corresponding EGM during the gaming session from the player tracking device; and
  updating the charms content database to include the monitored wagering activity conducting during the gaming session associated with the identified casino charm NFT.

8. The networked computer system of claim 6, wherein the processor is programmed to execute the algorithm including the steps of:
  querying the charms content database to retrieve a total coin-out amount associated with the identified casino charm NFT; and
  determining the charm luck value based on the total coin-out amount associated with the identified casino charm NFT.

9. The networked computer system of claim 8, wherein the processor is programmed to execute the algorithm including the steps of:
  querying the charms content database to determine a taxable jackpot amount associated with the identified casino charm NFT; and
  determining the charm luck value based on the total coin-out amount and the taxable jackpot amount associated with the identified casino charm NFT.

10. The networked computer system of claim 9, wherein the processor is programmed to execute the algorithm including the steps of:
  determining the charm luck value by:
  querying a charm luck data file including a plurality of ranked charm luck levels, each ranked charm luck level including a total luck value;
  identifying a highest ranked charm luck level having a corresponding total luck value equal to or less than a sum of the total coin-out amount and the taxable jackpot amount associated with the identified casino charm NFT; and
  displaying the determined charm luck value including the identified highest ranked charm luck level.

11. The networked computer system of claim 10, wherein the processor is programmed to execute the algorithm including the steps of:
  generating the charm luck data file including each ranked charm luck level including a corresponding numeric luck level value, a corresponding total luck value, a luck-to-next-level (LNLv) value, and a multiplier value;
  wherein the multiplier value is determined based on the corresponding numeric luck value;
  wherein the LNLv value is determined based on the multiplier value; and
  wherein the corresponding total luck value is determined as a sum of LNLv values associated with each lower ranked luck level.

12. The networked computer system of claim 11, wherein the processor is programmed to execute the algorithm including the steps of:
  calculating the multiplier value using:

$M = e^{1+0.045x}$ wherein:
  M=the multiplier value;
  x=the corresponding numeric luck value associated with the corresponding luck level.

13. The networked computer system of claim 12, wherein the processor is programmed to execute the algorithm including the steps of:
  calculating a corresponding LNLv value using:

$LNLv = P*(1+((1/M)*2.2277))$ wherein:
  LNLv=the corresponding LNLv value associated with the corresponding luck level;
  P=a previous LNLv value associated with a next lower luck level; and
  M=the multiplier value associated with the corresponding luck level.

14. A method of operating a networked computer system for displaying images associated with non-fungible tokens (NFTs) on electronic gaming machines (EGMs), the networked computer system including
  a player tracking device coupled to a corresponding EGM located within a casino property and a computer server including a processor coupled to the player tracking device and the corresponding EGM, the method including the processor performing an algorithm to display an animated sequence of computer-generated images on a display device of the corresponding EGM including the steps of:
  receiving a request to initiate a gaming session at the corresponding EGM from the player tracking device, the request including a patron ID identifying a player;
  querying a patron account database to determine a blockchain user account ID associated with the received patron ID;
  querying a blockchain system to identify a casino charm NFT owned by the blockchain user account ID;
  querying a charms content database to retrieve image data associated with the identified casino charm NFT;
  determining a charm luck value associated with the identified casino charm NFT indicating wagering activity associated with the identified casino charm NFT by:
  querying the charms content database to retrieve wagering activity associated with the identified casino charm NFT; and
  determining the charm luck value based on the wagering activity associated with the identified casino charm NFT; and
  rendering a game screen on the corresponding EGM displaying a wagering game and images of the identified casino charm NFT and the determined charm luck value.

15. The method of claim 14, including the processor performing the algorithm including the steps of:
  querying the blockchain system to identify a plurality of casino charm NFTs owned by the blockchain user account ID;
  querying the charms content database to retrieve image data associated with each of the plurality of casino charm NFTs owned by the blockchain user account ID;
  rendering a charm selection screen on the corresponding EGM including images of each casino charm NFT;
  receiving a player selection of a casino charm NFT via the charm selection screen; and
  rendering an image of the player selected casino charm NFT on the game screen displayed on the corresponding EGM.

16. The method of claim 14, including the processor performing the algorithm including the steps of:
  rendering the images of the identified casino charm NFT and the charm luck value on a lower portion of the game screen.

17. The method of claim 14, including the processor performing the algorithm including the steps of:
  initiating the gaming session by generating a unique gaming session record associated with the gaming session and associating the identified casino charm NFT with the unique gaming session record;
  receiving monitored wagering activity conducted via the corresponding EGM during the gaming session from the player tracking device; and
  updating the charms content database to include the monitored wagering activity conducting during the gaming session associated with the identified casino charm NFT.

18. The method of claim 14, including the processor performing the algorithm including the steps of:
  querying the charms content database to retrieve a total coin-out amount associated with the identified casino charm NFT; and
  determining the charm luck value based on the total coin-out amount associated with the identified casino charm NFT.

19. The method of claim 14, including the processor performing the algorithm including the steps of:
  receiving the request to initiate a gaming session including the patron ID being read from a player tracking card inserted into the player tracking device.

20. A non-transitory computer-readable storage media having computer-executable instructions embodied thereon to operate a networked computer system for displaying images associated with non-fungible tokens (NFTs) on electronic gaming machines (EGMs), the networked computer system including
  a player tracking device coupled to a corresponding EGM located within a casino property and a computer server including a processor coupled to the player tracking device and the corresponding EGM, when executed by the processor the computer-executable instructions cause the processor to perform an algorithm to display an animated sequence of computer-generated images on a display device of the corresponding EGM including the steps of:
  receiving a request to initiate a gaming session at the corresponding EGM from the player tracking device, the request including a patron ID identifying a player;
  querying a patron account database to determine a blockchain user account ID associated with the received patron ID;
  querying a blockchain system to identify a casino charm NFT owned by the blockchain user account ID;
  querying a charms content database to retrieve image data associated with the identified casino charm NFT;
  determining a charm luck value associated with the identified casino charm NFT indicating wagering activity associated with the identified casino charm NFT by:
  querying the charms content database to retrieve wagering activity associated with the identified casino charm NFT; and
  determining the charm luck value based on the wagering activity associated with the identified casino charm NFT; and
  rendering a game screen on the corresponding EGM displaying a wagering game and images of the identified casino charm NFT and the determined charm luck value.

* * * * *